United States Patent
Shen et al.

(10) Patent No.: US 8,229,457 B2
(45) Date of Patent: Jul. 24, 2012

(54) POSITIONING SYSTEM, POSITIONING METHOD, AND POSITIONING PROGRAM

(75) Inventors: Jiyun Shen, Yokohama (JP); Yasuhiro Oda, Yokosuka (JP); Kosei Takiishi, Ota-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 1187 days.

(21) Appl. No.: 12/029,041

(22) Filed: Feb. 11, 2008

(65) Prior Publication Data

US 2008/0207226 A1   Aug. 28, 2008

(30) Foreign Application Priority Data

Feb. 23, 2007   (JP) .................................. 2007-044259
Jun. 26, 2007   (JP) .................................. 2007-167908

(51) Int. Cl.
*H04W 24/00* (2009.01)
*G01S 3/02* (2006.01)
(52) U.S. Cl. .................. 455/456.1; 455/456.5; 342/450
(58) Field of Classification Search .... 455/456.1–456.6, 455/63.1, 65; 342/450–457
See application file for complete search history.

(56) References Cited

U.S. PATENT DOCUMENTS

| | | | |
|---|---|---|---|
| 5,945,948 A | | 8/1999 | Buford et al. |
| 7,072,669 B1 * | | 7/2006 | Duckworth ................ 455/456.1 |
| 2003/0125045 A1 | | 7/2003 | Riley et al. |
| 2004/0127230 A1 * | | 7/2004 | Bevan et al. ................ 455/456.5 |
| 2005/0020309 A1 * | | 1/2005 | Moeglein et al. ............. 455/561 |
| 2008/0261604 A1 | | 10/2008 | Ritter |

FOREIGN PATENT DOCUMENTS

CN   1231730 A   10/1999
JP   2004-93341   3/2004

OTHER PUBLICATIONS

Yilin Zhao, "Standardization of Mobile Phone Positioning for 3G Systems", IEEE Communications Magazine, Jul. 2002, pp. 108-116.
Samir S. Soliman, et al., "Geolocation technologies and applications for third generation wireless", Wireless Communications and Mobile Computing, vol. 2, 2002, pp. 229-251.

(Continued)

*Primary Examiner* — Wesley Kim
(74) *Attorney, Agent, or Firm* — Oblon, Spivak, McClelland, Maier & Neustadt, L.L.P.

(57) ABSTRACT

An object of the present invention is to implement accurate positioning of a mobile communication terminal even in an environment in which delay waves are included in radio waves arriving at the mobile communication terminal from radio wave sources. A positioning server 10 forming a positioning system for estimating a location of a cellular terminal 20 has a distance information acquisition unit 13 for acquiring information indicating distances calculated based on radio waves transmitted and received between a plurality of cellular base stations 30 and the cellular terminal 20; a direction information acquisition unit 14 for acquiring a plurality of pieces of information indicating directions of radio waves received by the cellular terminal 20; a virtual sector calculation unit 15 for calculating for each of the cellular base stations, a range of directions from the cellular base station 30 to the cellular terminal 20 from the information indicating the directions of the radio waves, based on a range calculation rule stored in advance; and a location calculation unit 16 for calculating the location of the cellular terminal 20, based on the distances and the range of directions.

18 Claims, 16 Drawing Sheets

OTHER PUBLICATIONS

Office Action issued Feb. 24, 2011 in Chinese Patent Application No. 200810080566.4 (with English translation).

European Office Action issued Mar. 4, 2011, in Patent Application No. 08 002 891.3.

The Extended European Search Report issued Nov. 5, 2010, in Application No./Patent No. 08002891.3-1248 / 1962102.

Communication pursuant to Article 94(3) EPC issued Jun. 8, 2011, in Application No. 08 002 891.3-1248.

Office Action issued Oct. 25, 2011, in Japanese Patent Application No. 2007-167908 with English translation.

European Office Action issued on Oct. 6, 2011 in corresponding European Application No. 08 002 891.3.

* cited by examiner

| ALL MEASUREMENT RESULTS | | | |
|---|---|---|---|
| i | $B_i$ | $\theta_i$ | $R_i$ |
| 1 | BTS-1 | $\pi/3$ | 305m |
| 2 | BTS-1 | $\pi/3$ | 400m |
| 3 | BTS-3 | $4\pi/3$ | 1540m |
| 4 | BTS-1 | 0 | 600m |
| 5 | BTS-3 | $4\pi/3$ | 1600m |
| 6 | BTS-2 | $\pi$ | 2300m |

(b)

| MEASUREMENT RESULTS AFTER CLUSTERING | | | |
|---|---|---|---|
| j | $B'_j$ | $\theta_{j,k}$ | $R_{j,k,l}$ |
| 1 | BTS-1 | $\pi/3$ | 305m |
| | | | 400m |
| | | 0 | 600m |
| 2 | BTS-3 | $4\pi/3$ | 1540m |
| | | | 1600m |
| 3 | BTS-2 | $\pi$ | 2300m |

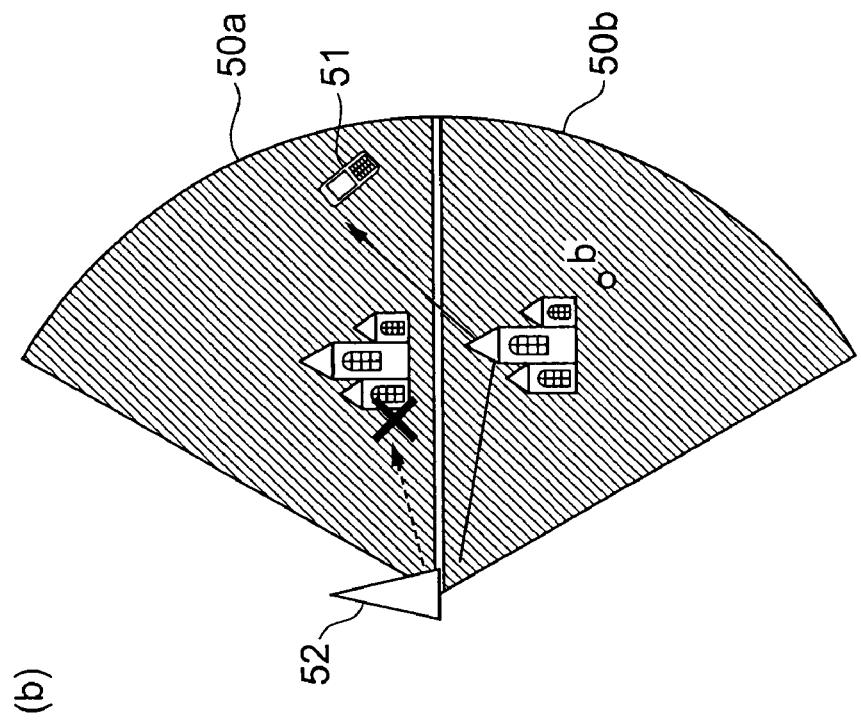
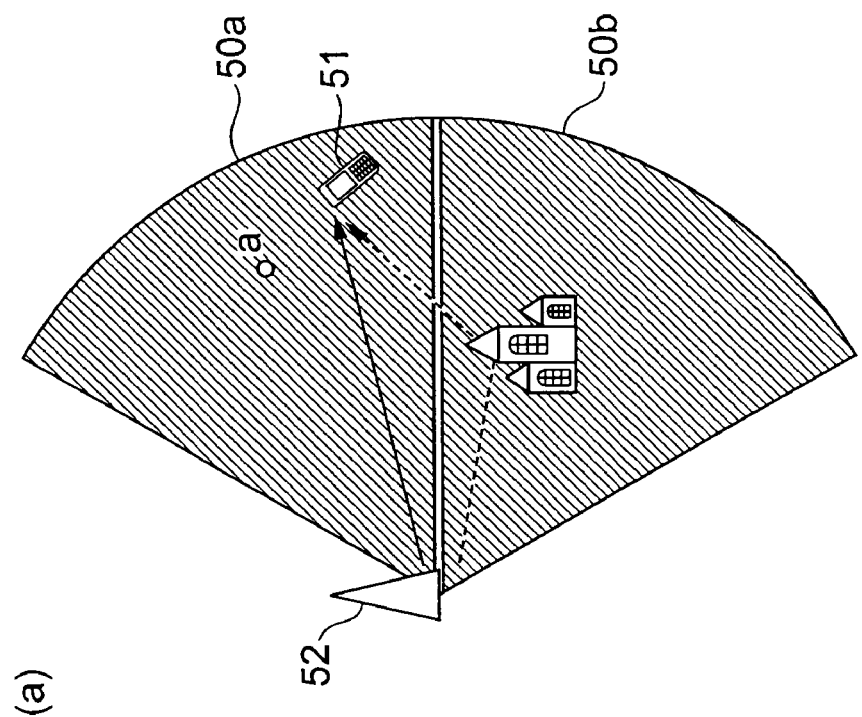
Fig.13

POSITIONING SYSTEM, POSITIONING METHOD, AND POSITIONING PROGRAM

BACKGROUND OF THE INVENTION

1. Field of the Invention

The present invention relates to a positioning system, a positioning method, and a positioning program for estimating a location of a mobile communication terminal.

2. Related Background of the Invention

There are conventionally known methods for using radio waves as radio signals to estimate a location of a mobile communication terminal receiving the radio waves. For example, in cases where the number of radio wave sources is three or more, an available method is to calculate distances from the mobile communication terminal to the sources, to find intersections of circles drawn by setting a center of each circle at the location of each source and using the calculated distance as a radius, and to define the intersections as the location of the mobile communication terminal. Systems of this type include GPS (Global Positioning System), AFLT (Advanced Forward Link Trilateration), and so on.

It is necessary to increase the number of sources depending upon the number of unknowns to be estimated, e.g., deviation of time synchronization, influence from propagation paths of radio waves, and so on. When the number of radio wave sources is less than 3, the foregoing location estimation method is not available. A variety of positioning methods have been proposed as location estimation methods of the mobile communication terminal under such circumstances. One of them is a method of estimating a distance and radio wave direction from a radio wave source to the terminal and estimating the location of the terminal, based thereon. When this method is applied, for example, to a cellular system, sector positioning is used if a base station as a radio wave source is sectorized. In the sector positioning, as shown in FIG. 12 (a), the location of the mobile communication terminal 51 is estimated to be a predetermined position in a sector 50, e.g., the centroid of the sector (location sector) 50 where the terminal is located (which is indicated by point a in the drawing; the same also applies hereinafter). Furthermore, high-accuracy sector positioning is available, as shown in FIG. 12 (b), in a system capable of measuring transmission delays (e.g., RTT: Round Trip Time), intensity attenuations, etc. of radio waves transmitted and received. Since the high-accuracy sector positioning permits us to measure the distance between the base station 52 and the terminal 51, based on the measured RTT or the like, the estimated location is calculated by approximating a signal direction to a location sector direction D being a direction obtained by equally dividing an angle of the sector from the base station 52 (this method is called RTT positioning where the RTT is used).

Furthermore, it is also possible to implement the RTT positioning, based on distances and sector positions from two different base stations 52 based on the RTT, as shown in FIG. 12 (c). This method is to calculate intersections of two circles with the center at the position of each base station 52 and the radius as the distance between each base station and the terminal and to estimate the location of the terminal to be an intersection included in the location sector 50. There is also hybrid positioning in which one of the base stations 52 in the above-mentioned method is replaced by a GPS satellite 53, as shown in FIG. 12 (d). The above-mentioned positioning methods are described, for example, in Yulin Zhao, "Standardization of Mobile Phone Positioning for 3G Systems," IEEE Communications Magazine, p.p. 108-116, July 2002, and Samir S. Soliman and Charles E. Wheatley, "Geolocation technologies and applications for third generation wireless," Wireless Communications and Mobile Computing, vol. 2, p.p. 229-251, 2002.

SUMMARY OF THE INVENTION

In the above-mentioned positioning methods, the positioning accuracy is significantly affected by the measurement accuracy of the distance between the radio wave source and the terminal, the accuracy of location information about in which cell or sector the terminal is located, and so on. A conceivable major factor to degrade the measurement accuracy of the distance by radio waves and the measurement accuracy of the location information is influence of delay waves of radio waves. A delay wave is a radio wave arriving at the terminal after reflected, diffracted, and scattered, and is received after a directly arriving radio wave (direct wave).

The influence of delay wave will be explained using FIG. 13. When a radio wave arrives directly at the terminal 51 from the base station 52 without being reflected, diffracted, or scattered, as shown in FIG. 13 (a), the distance can be relatively accurately derived between the base station 52 and the terminal 51. In addition, an arrival direction of the radio wave is a direction from the base station 52 to the terminal 51 and the terminal 51 can receive a radio wave of a sector 50a where it is located. This permits the terminal 51 to relatively accurately grasp the direction from the base station 52. The use of the direct wave in this manner enables accurate positioning.

On the other hand, where the radio wave arriving at the terminal 51 is a delay wave, as shown in FIG. 13 (b), the propagation path thereof becomes longer than that of the direct wave and this results in calculating the distance from the base station 52 to the terminal based on the delay wave larger than the real distance. Furthermore, with the delay wave, the arrival direction of the radio wave is different from the direction from the base station 52 to the terminal 51 and the terminal can receive a radio wave from another sector than the one 50a where the terminal is located. This causes the terminal 51 to grasp the incorrect direction as the direction from the base station 52. The use of the delay wave leads to a failure in accurate positioning as discussed above. It is usually the case in the cellular systems and the like that the direct wave is rarely received and many delay waves as described above are received, and it was thus difficult to implement accurate positioning of the terminal.

The preset invention has been accomplished in order to solve the above-discussed problem and an object of the present invention is to provide a positioning system, a positioning method, and a positioning program enabling implementation of accurate positioning of a mobile communication terminal even in an environment in which delay waves are included in radio waves arriving at the mobile communication terminal from at least one mobile communication terminal or from a plurality of mobile communication terminals.

In order to achieve the above object, a positioning system according to the present invention is a positioning system for estimating a location of a mobile communication terminal, comprising: distance information acquiring means for acquiring information indicating distances between at least one radio wave source and the mobile communication terminal calculated based on radio waves transmitted and received between the radio wave source and the mobile communication terminal; direction information acquiring means for acquiring a plurality of pieces of information indicating directions of radio waves transmitted from the radio wave source and received by the mobile communication terminal; direction range calculating means for calculating a range of directions from the radio wave source to the mobile communication terminal from the pieces of information indicating the directions of the radio waves, acquired by the direction information acquiring means, based on a range calculation rule stored in advance; and location calculating means for calculating the location of the mobile communication terminal, based on the distances acquired by the distance information acquiring means and the range of directions calculated by the direction range calculating means.

In order to achieve the above object, another positioning system according to the present invention is a positioning system for estimating a location of a mobile communication terminal, comprising: distance information acquiring means for acquiring information indicating distances between a plurality of radio wave sources and the mobile communication terminal calculated based on radio waves transmitted and received between the radio wave sources and the mobile communication terminal; direction information acquiring means for acquiring a plurality of pieces of information indicating directions of radio waves transmitted from the radio wave sources and received by the mobile communication terminal; direction range calculating means for calculating a range of directions from the radio wave sources to the mobile communication terminal from the pieces of information indicating the directions of the radio waves, acquired by the direction information acquiring means, based on a range calculation rule stored in advance; and location calculating means for calculating the location of the mobile communication terminal, based on the distances acquired by the distance information acquiring means and the range of directions calculated by the direction range calculating means.

In the positioning systems according to the present invention, the mobile communication terminal receives a plurality of radio waves from at least one radio wave source or from a plurality of radio wave sources. The positioning systems are arranged then to acquire the information indicating the directions of the radio waves and to calculate for each of the sources, the range of directions from the source to the mobile communication terminal from the information. On the other hand, the positioning systems are arranged to acquire the information indicating the distances between each source and the mobile communication terminal, based on the radio waves transmitted and received between the source and the mobile communication terminal. In the positioning systems, the location of the mobile communication terminal is calculated based on the information of the distances and the range of directions. Since in the positioning systems according to the present invention the positioning is performed based on the range of directions from at least one radio wave source or from the plurality of radio wave sources to the mobile communication terminal as described above, even if a delay wave is included in the radio waves transmitted from at least one radio wave source or from the plurality of radio wave sources, and received by the mobile communication terminal, and if there is a radio wave permitting accurate positioning, such as the direct wave, in the radio waves from the sources, it will be taken into consideration. Therefore, the positioning systems according to the present invention are able to perform accurate positioning of the mobile communication terminal even in an environment in which the delay waves are included in the radio waves arriving at the mobile communication terminal from at least one radio wave source or from the plurality of radio wave sources.

Preferably, the direction range calculating means calculates the range of directions, also based on a number of times the mobile communication terminal has received radio waves from each radio wave source. This configuration permits more accurate positioning, for example, by emphasizing the radio waves from the source from which more radio waves are received.

Preferably, the location calculating means comprises: reliability evaluating means for evaluating reliabilities of the radio waves for positioning of the mobile communication terminal, for each source, from the distances acquired by the distance information acquiring means and the range of directions calculated by the direction range calculating means, based on a reliability calculation rule stored in advance; and determining means for determining the radio wave source associated with information to be used for calculation of the location of the mobile communication terminal, based on the reliabilities evaluated by the reliability evaluating means. This configuration permits the positioning based on the radio waves from the source suitable for positioning, and thus enables much more accurate positioning.

Preferably, the position calculating means calculates the direction from the source to the mobile communication terminal and the distance between the source and the mobile communication terminal, based on the radio waves transmitted and received between the source determined by the determining means, and the mobile communication terminal, and calculates the location of the mobile communication terminal from the direction and the distance. This configuration permits the location of the mobile communication terminal to reliably be calculated.

Specifically, the location calculating means preferably calculates the direction from the source determined by the determining means, to the mobile communication terminal, as a center of the range of directions from the source to the mobile communication terminal. Furthermore, the location calculating means preferably calculates the direction from the source determined by the determining means, to the mobile communication terminal, as an average of directions of the radio waves transmitted from the source and received by the mobile communication terminal. Moreover, the location calculating means preferably calculates the direction from the source determined by the determining means, to the mobile communication terminal, as a direction to provide a minimum distance between the source and the mobile communication terminal calculated based on the radio waves, among directions of the radio waves transmitted from the source and received by the mobile communication terminal.

Specifically, the location calculating means preferably calculates the distance between the source determined by the determining means, and the mobile communication terminal, as one of the distances calculated based on the radio waves transmitted and received between the source and the mobile communication terminal. Furthermore, the location calculating means preferably calculates the distance between the source determined by the determining means, and the mobile communication terminal, as a minimum of the distances calculated based on the radio waves transmitted and received between the source and the mobile communication terminal. Yet furthermore, the location calculating means preferably calculates the distance between the source determined by the determining means, and the mobile communication terminal, as an average of the distances calculated based on the radio waves transmitted and received between the source and the mobile communication terminal. In addition, the location calculating means preferably calculates the distance between the source determined by the determining means, and the mobile communication terminal, by clustering the distances calculated based on the radio waves transmitted and received between the source and the mobile communication terminal, into ranges of distances.

The positioning system according to the present invention preferably further comprises transmission control means for performing a control to let the source transmit a positioning signal to the mobile communication terminal, as the radio waves for use for calculation of the distances acquired by the distance information acquiring means and for acquisition of the directions by the direction information acquiring means. Since this configuration permits the radio wave source to certainly emit the radio waves and permits the positioning system to definitely determine the radio waves used in the positioning, the present invention can be surely carried out.

Preferably, the distance information acquiring means calculates the distance, based on a propagation delay or an intensity attenuation of a response signal transmitted from the mobile communication terminal having received the positioning signal transmitted from the source under the control by the transmission control means, in accordance with the reception of the positioning signal, and received by the source. Since this configuration permits the positioning system to certainly acquire the distance between the source and the mobile communication terminal, the present invention can be certainly carried out.

Preferably, the direction information acquiring means acquires information of directions based on sectors of the radio waves received by the mobile communication terminal, as the information indicating the directions of the radio waves. Since this configuration permits the positioning system to certainly acquire the information indicating the directions of the radio waves, the present invention can be surely carried out.

Incidentally, the present invention can also be described as the invention of positioning methods and positioning programs as described below, as well as it can be described as the invention of the positioning systems as described above. This is just a difference in category or the like but they are substantially the same invention, with the same action and effect.

Namely, a positioning method according to the present invention is a positioning method for estimating a location of a mobile communication terminal, comprising: a distance information acquiring step of acquiring information indicating distances between at least one radio wave source and the mobile communication terminal calculated based on radio waves transmitted and received between the radio wave source and the mobile communication terminal; a direction information acquiring step of acquiring a plurality of pieces of information indicating directions of radio waves transmitted from the radio wave source and received by the mobile communication terminal; a direction range calculating step of calculating a range of directions from the radio wave source to the mobile communication terminal from the pieces of information indicating the directions of the radio waves, acquired in the direction information acquiring step, based on a range calculation rule stored in advance; and a location calculating step of calculating the location of the mobile communication terminal, based on the distances acquired in the distance information acquiring step and the range of directions calculated in the direction range calculating step.

Another positioning method according to the present invention is a positioning method for estimating a location of a mobile communication terminal, comprising: a distance information acquiring step of acquiring information indicating distances between a plurality of radio wave sources and the mobile communication terminal calculated based on radio waves transmitted and received between the radio wave sources and the mobile communication terminal; a direction information acquiring step of acquiring a plurality of pieces of information indicating directions of radio waves transmitted from the radio wave sources and received by the mobile communication terminal; a direction range calculating step of calculating a range of directions from the radio wave sources to the mobile communication terminal from the pieces of information indicating the directions of the radio waves, acquired in the direction information acquiring step, based on a range calculation rule stored in advance; and a location calculating step of calculating the location of the mobile communication terminal, based on the distances acquired in the distance information acquiring step and the range of directions calculated in the direction range calculating step.

Namely, a positioning program according to the present invention is a positioning program for letting a computer estimate a location of a mobile communication terminal, the positioning program letting the computer execute: a distance information acquiring mechanism of acquiring information indicating distances between at least one radio wave source and the mobile communication terminal calculated based on radio waves transmitted and received between the radio wave source and the mobile communication terminal; a direction information acquiring mechanism of acquiring a plurality of pieces of information indicating directions of radio waves transmitted from the radio wave source and received by the mobile communication terminal; a direction range calculating mechanism of calculating a range of directions from the radio wave source to the mobile communication terminal from the pieces of information indicating the directions of the radio waves, acquired by the direction information acquiring mechanism, based on a range calculation rule stored in advance; and a location calculating mechanism of calculating the location of the mobile communication terminal, based on the distances acquired by the distance information acquiring mechanism and the range of directions calculated by the direction range calculating mechanism.

Namely, another positioning program according to the present invention is a positioning program for letting a computer estimate a location of a mobile communication terminal, the positioning program letting the computer execute: a distance information acquiring mechanism of acquiring information indicating distances between a plurality of radio wave sources and the mobile communication terminal calculated based on radio waves transmitted and received between the radio wave sources and the mobile communication terminal; a direction information acquiring mechanism of acquiring a plurality of pieces of information indicating directions of radio waves transmitted from the radio wave sources and received by the mobile communication terminal; a direction range calculating mechanism of calculating a range of directions from the radio wave sources to the mobile communication terminal from the pieces of information indicating the directions of the radio waves, acquired by the direction information acquiring mechanism, based on a range calculation rule stored in advance; and a location calculating mechanism of calculating the location of the mobile communication terminal, based on the distances acquired by the distance information acquiring mechanism and the range of directions calculated by the direction range calculating mechanism.

Since in the present invention the positioning is performed based on the range of directions of the radio waves from the radio wave source(s) to the mobile communication terminal, even if delay waves are included in the radio waves received by the mobile communication terminal, and if the radio waves contain the radio wave permitting accurate positioning, e.g., the direct wave, it will be taken into consideration. Therefore, the present invention enables accurate positioning of the mobile communication terminal even in an environment in which the delay waves are included in the radio waves arriving at the mobile communication terminal from at least one mobile communication terminal or from the plurality of mobile communication terminals.

BRIEF DESCRIPTION OF THE DRAWINGS

FIG. 7 is tables showing the measurement results with positioning signals.

FIG. 13 is a drawing showing how radio waves propagate from a cellular base station to a cellular terminal.

DESCRIPTION OF THE PREFERRED EMBODIMENTS

Preferred embodiments in a cellular system of the positioning system and positioning method according to the present invention will be described below in detail with reference to the drawings. The same elements will be denoted by the same reference symbols throughout the description of the drawings, without redundant description.

Figure 1:
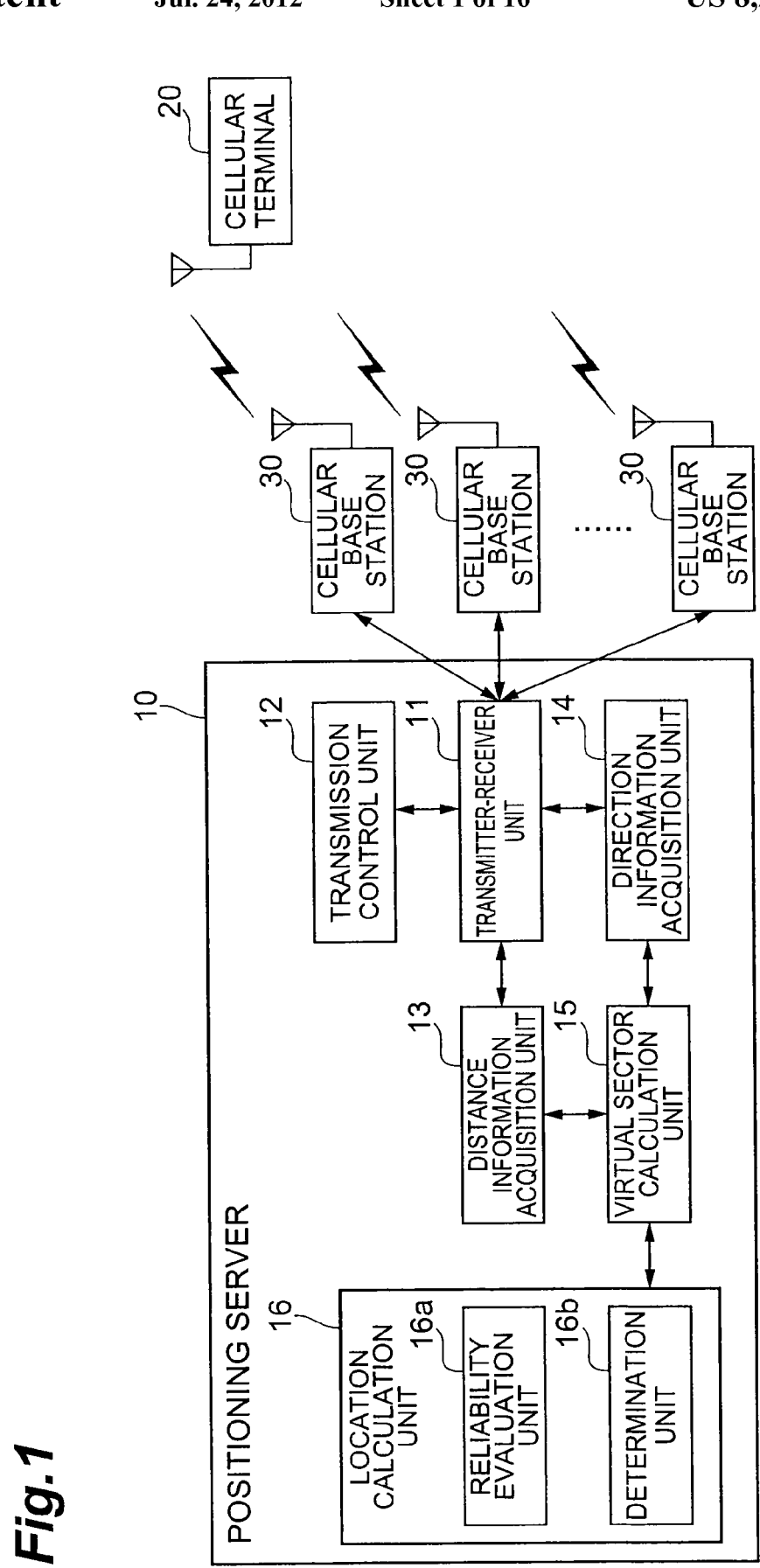
FIG. 1 is a drawing showing a functional configuration of a positioning server being a positioning system according to an embodiment of the present invention.

FIG. 1 shows a positioning server 10 which is a positioning system according to the present embodiment. The positioning server 10 is a device for estimating a location of a cellular terminal 20 being a mobile communication terminal included in a cellular system. Positioning of the cellular terminal 20 by the positioning server 10 is implemented using the framework of the cellular system being a mobile communication system. Namely, as shown in FIG. 1, the positioning is carried out by making use of execution of mobile communication through wireless communication of the cellular terminal 20 with any one of a plurality of cellular base stations 30 included in a mobile communication network. The positioning server 10 is connected to the plurality of cellular base stations 30 so as to be able to exchange information with each of the cellular base stations 30, and performs the positioning on the basis of the information. The positioning server 10 may be included in the mobile communication network.

The cellular terminal 20 is a mobile communication terminal that can perform mobile communication. The cellular terminal 20 receives pilot signals (broadcast signals) transmitted from cellular base stations 30 and registers its location with any one of the cellular base stations 30 on the basis of the pilot signals, thereby initiating wireless communication with the cellular base station 30. Specifically, when the cellular terminal 20 starts to perform the wireless communication with the cellular base station 30, it is located in a cell of the cellular base station 30 (the cell in which the cellular terminal 20 is located will be called a location cell). The cellular terminal 20 receives a radio wave being a positioning signal used in positioning by the positioning server 10, from the cellular base station 30 and transmits a radio wave being a response signal thereto, to the cellular base station 30. The cellular terminal 20 is provided with information set for uniquely identifying itself, e.g., a phone number, so that the positioning server 10 and cellular base stations 30 can identify the cellular terminal 20 on the basis of the information. The cellular terminal 20 is equipped with such hardware as a CPU (Central Processing Unit), memories, and a wireless communication module.

Figure 2:
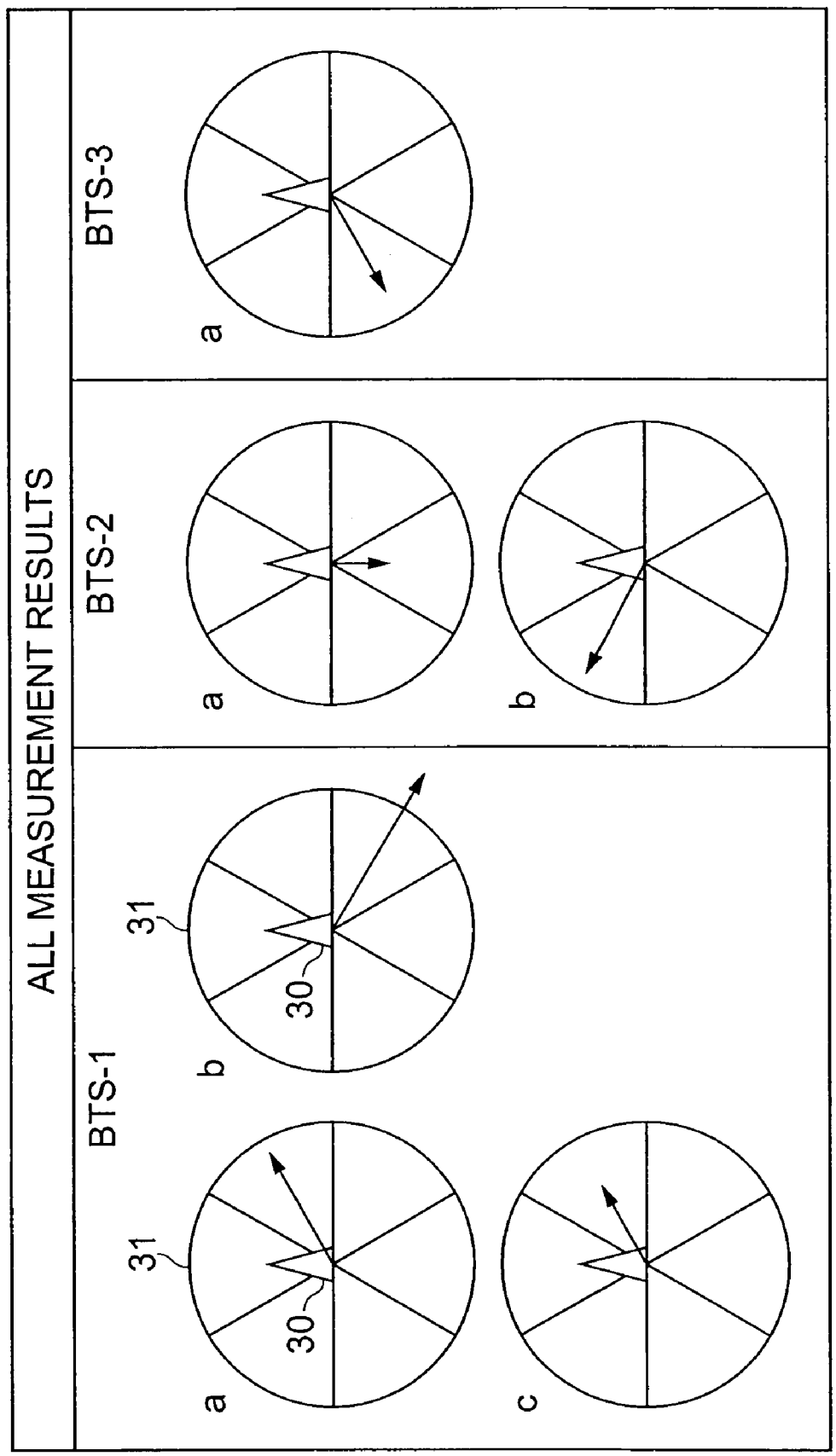
FIG. 2 is a drawing showing some examples of the measurement results with positioning signals from respective cellular base stations.

Each cellular base station 30 is a constituent element in the mobile communication network, and radio wave source for emitting a radio wave for positioning, and is located at a predetermined position. Each cellular base station 30 is provided with information set for uniquely identifying the cellular base station 30, e.g., a base station ID and position information of the base station, so that the positioning server 10 and cellular terminal 20 can identify the cellular base station 30 on the basis of the information. Each cellular base station 30 is sectorized and is provided with a plurality of sectors set in respective directions in which radio waves are transmitted. The sectors are arranged, for example, in such a manner that six sectors are set for one cellular base station 30 as shown in FIG. 2. In this case, an angle of one sector from the cellular base station 30 is $\pi/3$ (in terms of the radian system, which will also be applied hereinafter). The pilot signal received for communication by the cellular terminal 20 contains a sector ID being information to identify a sector, e.g., a sector ID, and the sector is also identified on the occasion of communication by the cellular terminal 20 (the sector will be referred to as a location sector).

The cellular base stations 30 are controlled by the positioning server 10, as described below, to transmit the positioning signal to the cellular terminal 20. When a cellular base station 30 receives a response signal transmitted from the cellular terminal 20 having received the positioning signal, it notifies the positioning server 10 of the base station ID and the sector ID being the information indicating the location cell and the location sector of the cellular terminal 20 contained in the response signal. The cellular base station 30 performs measurement for calculation of the distance between the cellular base station 30 and the cellular terminal 20, e.g., a round trip time (RTT) of the positioning signal and the response signal, the signal intensity of the response signal, and so on. The RTT is measured by the cellular base station 30 from a transmission timing of the positioning signal and a reception timing of the response signal to the positioning signal. The RTT measurement can be performed using any one of existing methods taking account of a processing delay or the like in the cellular terminal 20. The cellular base station 30 also notifies the positioning server 10 of the result of this measurement. Each cellular base station 30 is configured with such hardware as a CPU (Central Processing Unit), memories, and a wireless communication module.

A positioning method in the positioning server 10 according to the present embodiment will be schematically described below. In the present method, the positioning server 10 acquires information of the direction of reception of the positioning signal (radio wave) and the distance between the cellular base station 30 and the cellular terminal 20, based on the positioning signal received by the cellular terminal 20 from the cellular base station 30. In the present embodiment, a sector direction is used as the direction of reception of the positioning signal. In the present method the positioning server 10 acquires the information about a plurality of radio waves from a plurality of reception results by the cellular terminal 20. For example, as shown in FIG. 2, a total of six pieces of information are acquired from three cellular base stations 30 (the base station IDs of which are "BTS-1," "BTS-2," and "BTS-3").

Figure 3:
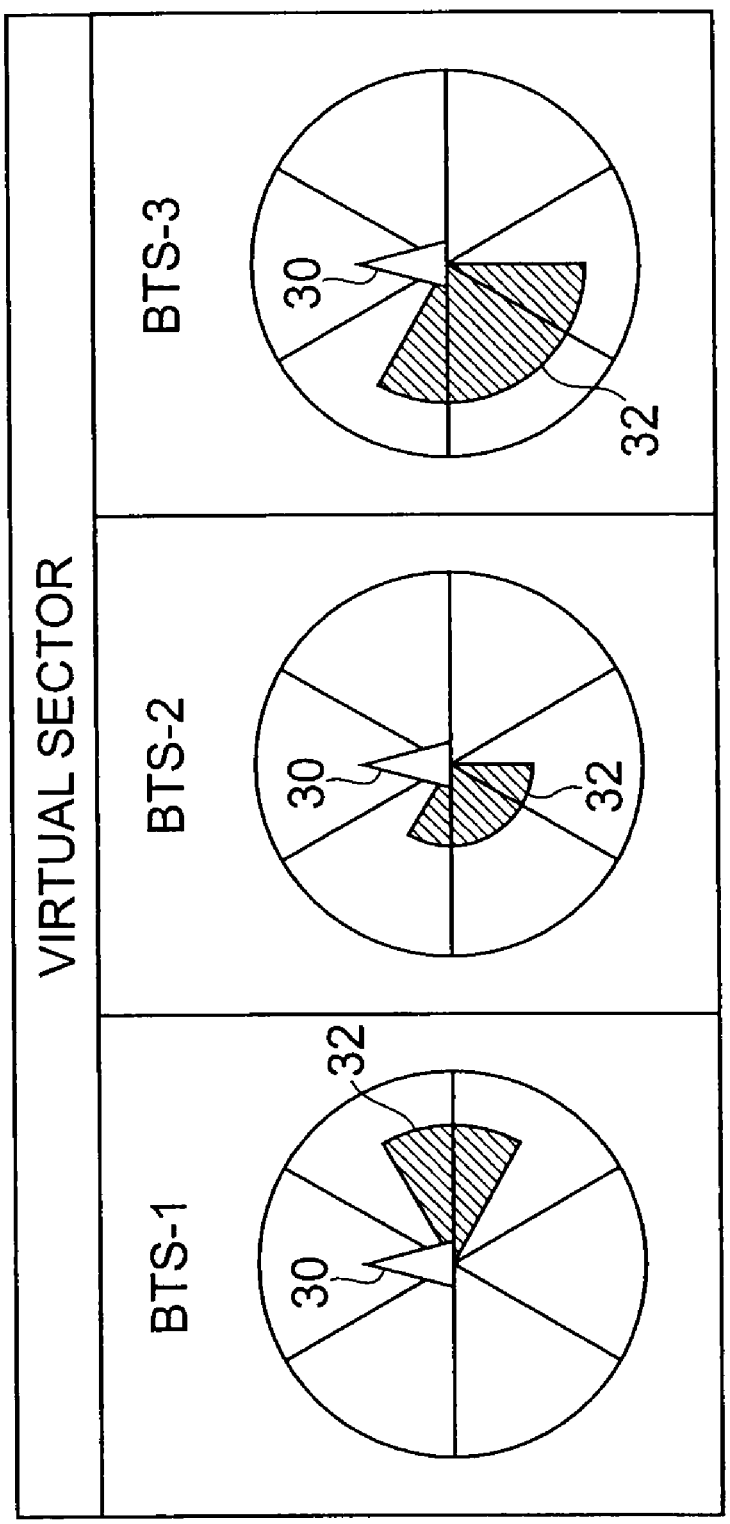
FIG. 3 is a drawing showing virtual sectors of respective cellular base stations.

For each cellular base station 30, a hypothetical sector (virtual sector) 32 as shown in FIG. 3 is generated from the distances and radio wave directions acquired in this manner, based on a rule set in advance. The virtual sector 32 is a sector indicating a range of places where the cellular terminal 20 can exist, in accordance with the sectors 31. The virtual sector 32 is identified by a radius (distance from the cellular base station 30), a direction, and an angle spread (range of directions). In the present method the location of the cellular terminal 20 is estimated based on this virtual sector 32.

A functional configuration of the positioning server 10 will be described below. As shown in FIG. 1, the positioning server 10 is composed of a transmitter-receiver unit 11, a transmission control unit 12, a distance information acquisition unit 13, a direction information acquisition unit 14, a virtual sector calculation unit 15, and a location calculation unit 16.

The transmitter-receiver unit 11 is a means for transmitting and receiving information to and from the cellular base stations 30. The transmitter-receiver unit 11 outputs the information received from the cellular base stations 30 to the distance information acquisition unit 13 or to the direction information acquisition unit 14 according to the information.

The transmission control unit 12 is a transmission controlling means for performing a control to let the cellular base stations 30 transmit the positioning signal as a radio wave for positioning to the cellular terminal 20. The transmission control unit 12 transmits a signal for the control through the transmitter-receiver unit 11 to the cellular base stations 30.

The cellular base stations 30 subjected to the control transmit the positioning signal to the cellular terminal 20. When the cellular terminal 20 receives the positioning signal, it transmits a radio wave as a response signal to the positioning signal to the cellular base stations 30. When a cellular base station 30 receives the response signal, it transmits to the positioning server 10, as described above, the base station ID indicating the location cell, and the sector ID indicating the location sector, and the information for calculation of the distance such as the RTT. These pieces of information are received by the transmitter-receiver unit 11 as described above.

The distance information acquisition unit 13 is a distance information acquiring means for acquiring the information indicating the distance between the cellular base station 30 and the cellular terminal 20 calculated based on the radio waves transmitted and received between at least one cellular base station 30 or a plurality of cellular base stations 30, and the cellular terminal 20. Specifically, the distance information acquisition unit 13 receives input of the information indicating the RTT, which was transmitted from the cellular base station 30 to the positioning server 10, from the transmitter-receiver unit 11 and calculates the distance on the basis of the information, thereby to acquire the information indicating the distance. Namely, the distance information acquisition unit 13 calculates and acquires the distance, based on a propagation delay of radio waves. The calculation of the distance from the RTT can be implemented using any one of the existing methods. The calculation of distance may be performed by any method other than the one using the RTT as described above, and may be performed by measuring an intensity attenuation of a radio wave by the cellular base station 30 and calculating the distance on the basis of the attenuation. This calculation of distance can be performed by any one of the existing methods. The distance information acquisition unit 13 outputs the acquired information of distance, together with the information identifying the cellular terminal 20 and the cellular base station 30, to the virtual sector calculation unit 15.

The direction information acquisition unit 14 is a direction information acquiring means for acquiring information indicating directions of radio waves transmitted from at least one cellular base station 30 or from a plurality of cellular base stations 30 and received by the cellular terminal 20. The information indicating a direction of a radio wave is, specifically, the sector ID of the location sector. The positioning server 10 retains the information about sectors, e.g., a configuration of sectors of each cellular base station 30, in a database or the like, and refers to the information to grasp in which direction each sector associated with a certain sector ID is directed. The direction information acquisition unit 14 outputs the acquired direction information, together with the information identifying the cellular terminal 20 and cellular base stations 30, to the virtual sector calculation unit 15.

The virtual sector calculation unit 15 is a means for calculating the aforementioned virtual sector for each cellular base station 30, from the distance information fed from the distance information acquisition unit 13 and the radio wave direction information fed from the direction information acquisition unit 14. Specifically, the virtual sector calculation unit 15 calculates a radius of a virtual sector (an estimated value of the distance from the cellular terminal 20 to the cellular base station 30), a (orientation) direction of a virtual sector (an estimated value of the direction from the cellular base station 30 to the cellular terminal 20), and an angle spread of the direction (range of directions). The calculation of these is performed based on a calculation rule of the virtual sector stored in advance in the virtual sector calculation unit 15. Namely, the virtual sector calculation unit 15 is a direction range calculating means for calculating for each cellular base station 30, the range of directions (spread of directions) from the cellular base station 30 to the cellular terminal 20 from the information indicating the directions of radio waves fed from the direction information acquisition unit 14, based on the range calculation rule stored in advance. A specific method will be described later as to how to calculate the virtual sector, i.e., what is the calculation rule of the virtual sector. The virtual sector calculation unit 15 outputs the calculated virtual sector information to the location calculation unit 16.

The location calculation unit 16 is a location calculating means for calculating the location of the cellular terminal 20, based on the virtual sector information fed from the virtual sector calculation unit 15. The location of the cellular terminal 20 is calculated according to a location calculation rule stored in advance in the location calculation unit 16. As shown in FIG. 1, the location calculation unit 16 is constructed including a reliability evaluation unit 16a and a determination unit 16b.

The reliability evaluation unit 16a is a reliability evaluating means for evaluating a reliability of each virtual sector from the virtual sector information fed from the virtual sector calculation unit 15, based on a reliability evaluation rule stored in advance. The evaluation of the reliability of the virtual sector is equivalent to evaluation of a reliability of a radio wave for each cellular base station 30 about how reliable the radio wave from the cellular base station 30 is, in terms of the positioning of the cellular terminal 20. The reliability evaluation unit 16a outputs the information indicating the evaluated reliability of each virtual sector, to the determination unit 16b.

The determination unit 16b is a determining means for determining a virtual sector associated with the information used in the calculation of the location of the cellular terminal 20, based on the reliability evaluated by the reliability evaluation unit 16a. The determination of the virtual sector is equivalent to determination of the cellular base station 30 associated with the information used in the calculation of the location of the cellular terminal 20. For example, where the location calculation rule is to perform the RTT positioning using radio waves from one cellular base station 30, a virtual sector with the highest reliability is determined as the virtual sector associated with the information used in the calculation of the location.

The location calculation unit 16 calculates the location of the cellular terminal 20, e.g., as information indicating a latitude and longitude thereof, using the information of the virtual sector determined by the determination unit 16b. Namely, the location calculation unit 16 calculates the direction from the base station 30 associated with the virtual sector, to the cellular terminal 20, and the distance between the base station 30 and the cellular terminal 20, based on the radio waves of the virtual sector determined by the determination unit 16b, and calculates the location of the mobile communication terminal 20 from the direction and distance. This configuration permits the positioning server to reliably calculate the location of the cellular terminal 20.

It will be described in more detail later, but, specifically, the location calculation unit 16 is preferably configured to calculate the direction from the base station 30 associated with the virtual sector determined by the determination unit 16b, to the cellular terminal 20, as a center of the range of directions of the virtual sector. The location calculation unit 16 is also preferably configured to calculate the direction from the base station 30 associated with the virtual sector determined by the determination unit 16b, to the cellular terminal 20, as an average of directions of the radio waves transmitted from the base station 30 and received by the cellular terminal 20. The location calculation unit 16 is also preferably configured to calculate the direction from the base station 30 associated with the virtual sector determined by the determination unit 16b, to the cellular terminal 20, as a direction in which the distance between the base station 30 and the cellular terminal 20 calculated based on the radio waves is minimum, out of the directions of the radio waves transmitted from the base station 30 and received by the cellular terminal 20.

Specifically, the location calculation unit 16 is preferably configured to calculate the distance between the base station 30 associated with the virtual sector determined by the determination unit 16b, and the cellular terminal 20, as any one of distances calculated based on the radio waves transmitted and received between the base station 30 and the cellular terminal 20. The location calculation unit 16 is also preferably configured to calculate the distance between the base station 30 associated with the virtual sector determined by the determination unit 16b, and the cellular terminal 20, as a minimum distance out of the distances calculated based on the radio waves transmitted and received between the base station 30 and the cellular terminal 20. The location calculation unit 16 is also preferably configured to calculate the distance between the base station 30 associated with the virtual sector determined by the determination unit 16b, and the cellular terminal 20, as an average of the distances calculated based on the radio waves transmitted and received between the base station 30 and the cellular terminal 20. The location calculation unit 16 is also preferably configured to calculate the distance between the base station 30 associated with the virtual sector determined by the determination unit 16b, and the cellular terminal 20, by clustering the distances calculated based on the radio waves transmitted and received between the base station 30 and the cellular terminal 20, into ranges of distances.

The positioning server 10 retains the information indicating the positions of the respective cellular base stations 30 (e.g., information indicating latitudes and longitudes of the cellular base stations 30) in a database or the like and uses the information of these positions in the calculation of the location of the cellular terminal 20. The location calculation unit 16 outputs the information indicating the calculated location of the cellular terminal 20, according to need. The location calculation process by the location calculation unit 16, including the processes by the reliability evaluation unit 16a and the determination unit 16b, will be described later in more detail.

Figure 4:
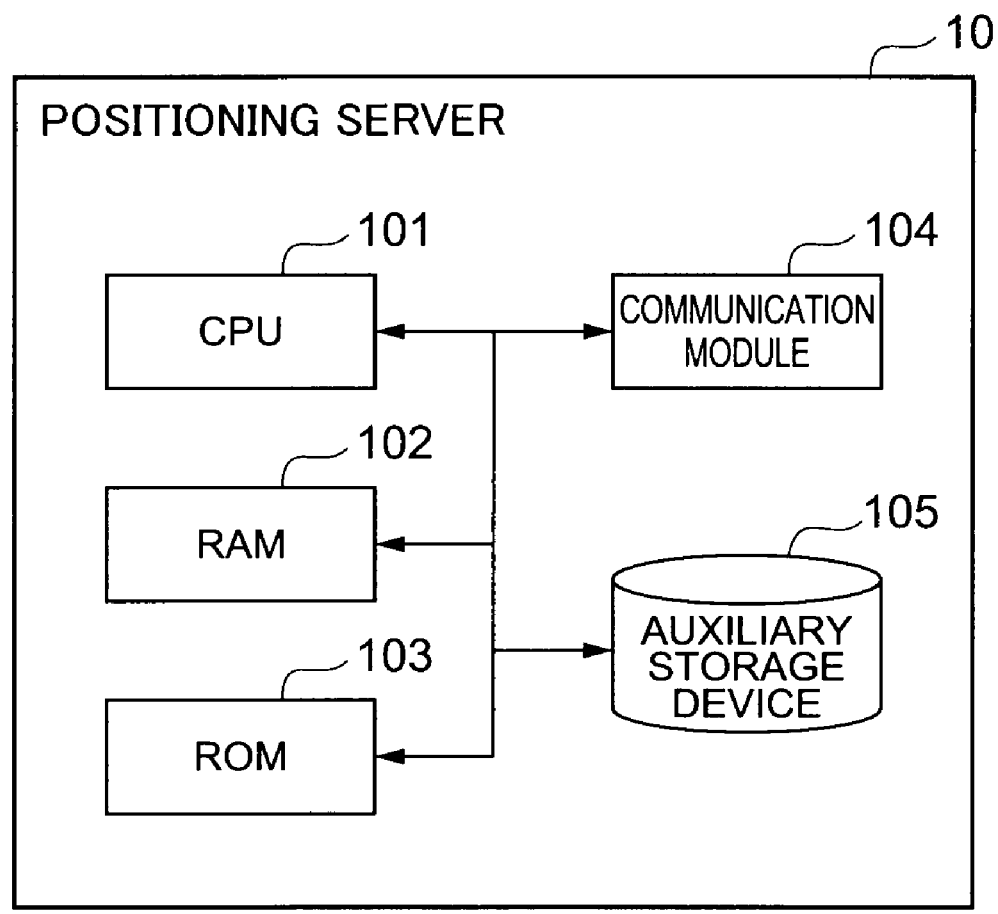
FIG. 4 is a drawing showing a hardware configuration of the positioning server according to an embodiment of the present invention.

FIG. 4 shows a hardware configuration of the positioning server 10. As shown in FIG. 4, the positioning server 10 is constructed as one including a computer with such hardware as a CPU 101, a RAM (Random Access Memory) 102 and a ROM (Read Only Memory) 103 as main storage devices, a communication module 104 for execution of communication, and an auxiliary storage device 105 such as a hard disk drive. These components operate according to a program or the like to exercise the aforementioned functions of the positioning server 10.

Figure 5:
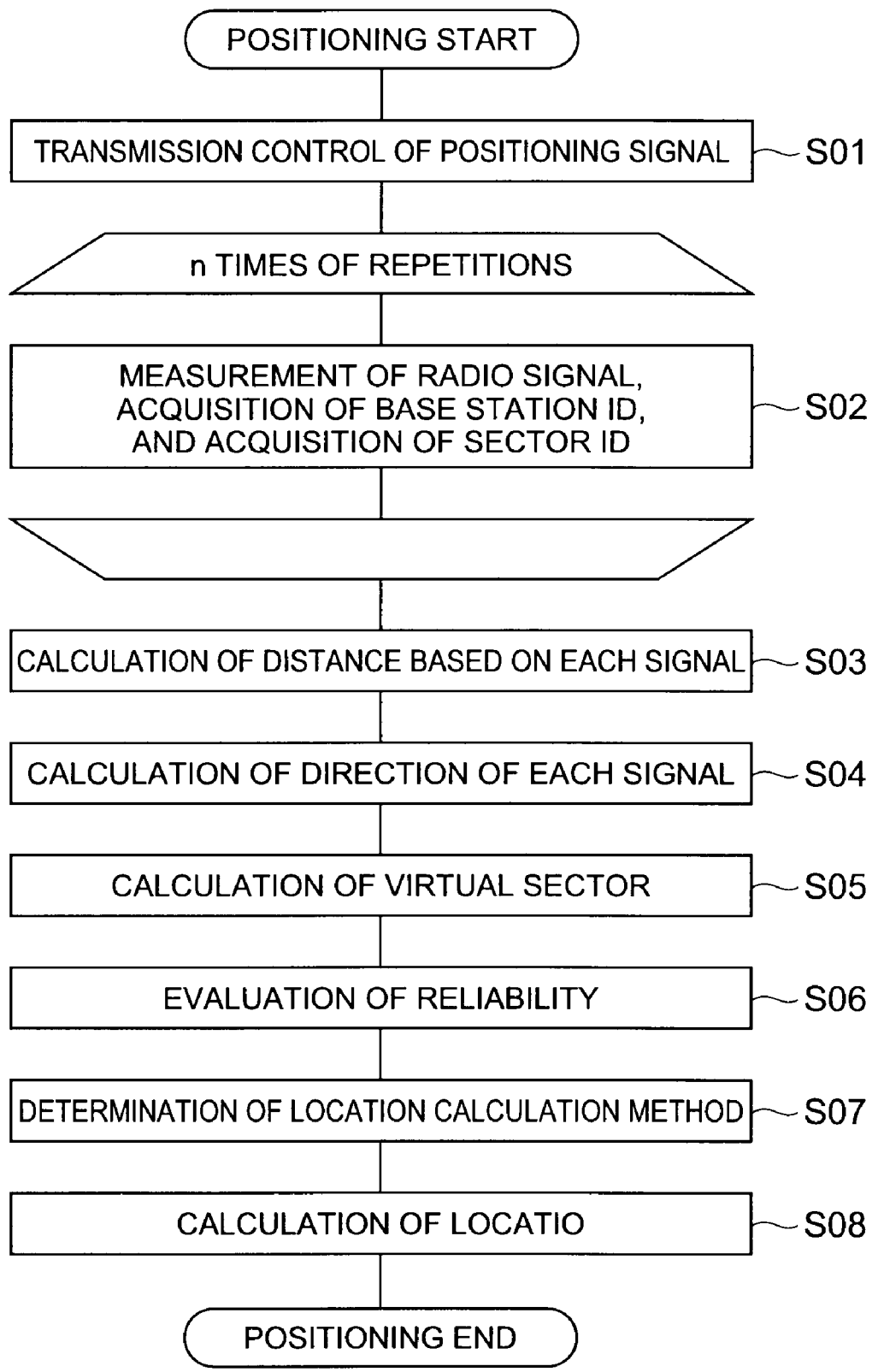
FIG. 5 is a flowchart showing a processing procedure (positioning method) executed in the positioning server according to an embodiment of the present embodiment.

Subsequently, a processing procedure (positioning method) executed in the positioning server 10, cellular terminal 20, and cellular base stations 30 according to the present embodiment will be described below using the flowchart of FIG. 5. This processing procedure is initiated, for example, when the positioning server 10 receives a positioning request through the mobile communication network from the cellular terminal 20. The positioning process may also be initiated as triggered by any operation other than the above-described operation.

First, in the positioning server 10, the transmission control unit 12 performs the control to let each cellular base station 30 transmit the positioning signal to the cellular terminal 20 (S01, a transmission control step). This control results in transmission of the positioning signal from the cellular base stations 30 to the cellular terminal 20. The positioning signal is successively transmitted, for example, at constant intervals of several hundred μs from the cellular base stations 30.

The cellular terminal 20 receives a pilot signal transmitted from a cellular base station 30, registers its location on the basis of the pilot signal, and performs wireless communication with the cellular base station 30 (of the location cell) associated with the location registration. Furthermore, the cellular terminal 20 identifies a sector, based on the information included in the pilot signal, and then performs wireless communication. The cellular terminal 20 stores the base station ID of the location cell and the sector ID of the location sector. When the cellular terminal 20 receives the positioning signal, it generates a response signal to the positioning signal and transmits it to the cellular base station 30 of the location cell. The response signal contains the information identifying the cellular terminal 20, and the sector ID of the location sector.

When the cellular base station 30 of the location cell receives the response signal from the cellular terminal 20, it transmits to the positioning server 10, the information identifying the cellular terminal 20 and the sector ID of the location sector included in the signal, and the base station ID of its own being the base station ID of the location cell. The cellular base station 30 measures the information for measurement of the distance such as the RTT and transmits the information to the positioning server 10. In the positioning server 10, the transmitter-receiver unit 11 receives the transmitted information (S02). In the positioning server 10, thereafter, these pieces of information are managed as information corresponding to one positioning signal. In the positioning server 10, the foregoing pieces of information received by the transmitter-receiver unit 11 are outputted to the distance information acquisition unit 13 and to the direction information acquisition unit 14 according to the information.

This reception of information is repeatedly carried out until the number of times of reception reaches a predetermined number n. Namely, the cellular terminal 20 receives the positioning signal n times and the positioning server 10 acquires the information in each time of reception. This number n is stored, for example, in the transmitter-receiver unit 11 of the positioning server 10. When the number of times of reception associated with the cellular terminal 20 reaches the number n, the positioning server may be arranged to notify the transmission control unit 12 of the fact and to terminate the control of transmission of the positioning signal from the cellular base stations 30. The number n is a number of not less than 2 (i.e., plural pieces of information are acquired) and, for example, the number is set to a numeral selected from the second half of single-digit figures to double-digit figures. A possibility of accurate positioning becomes higher with increase in the number n. The acquisition of n pieces of information is arranged to be performed in several seconds.

In the positioning server 10, the distance information acquisition unit 13 then calculates the distance between the cellular terminal 20 and the cellular base station 30 (of the location cell), based on the information for measurement of the distance such as the RTT, with each positioning signal (S03, a distance information acquisition step). Namely, information indicating n distances is calculated. The information of distances is, for example, numerals in meters. The calculated information of distances is fed to the virtual sector calculation unit 15.

Figure 6:
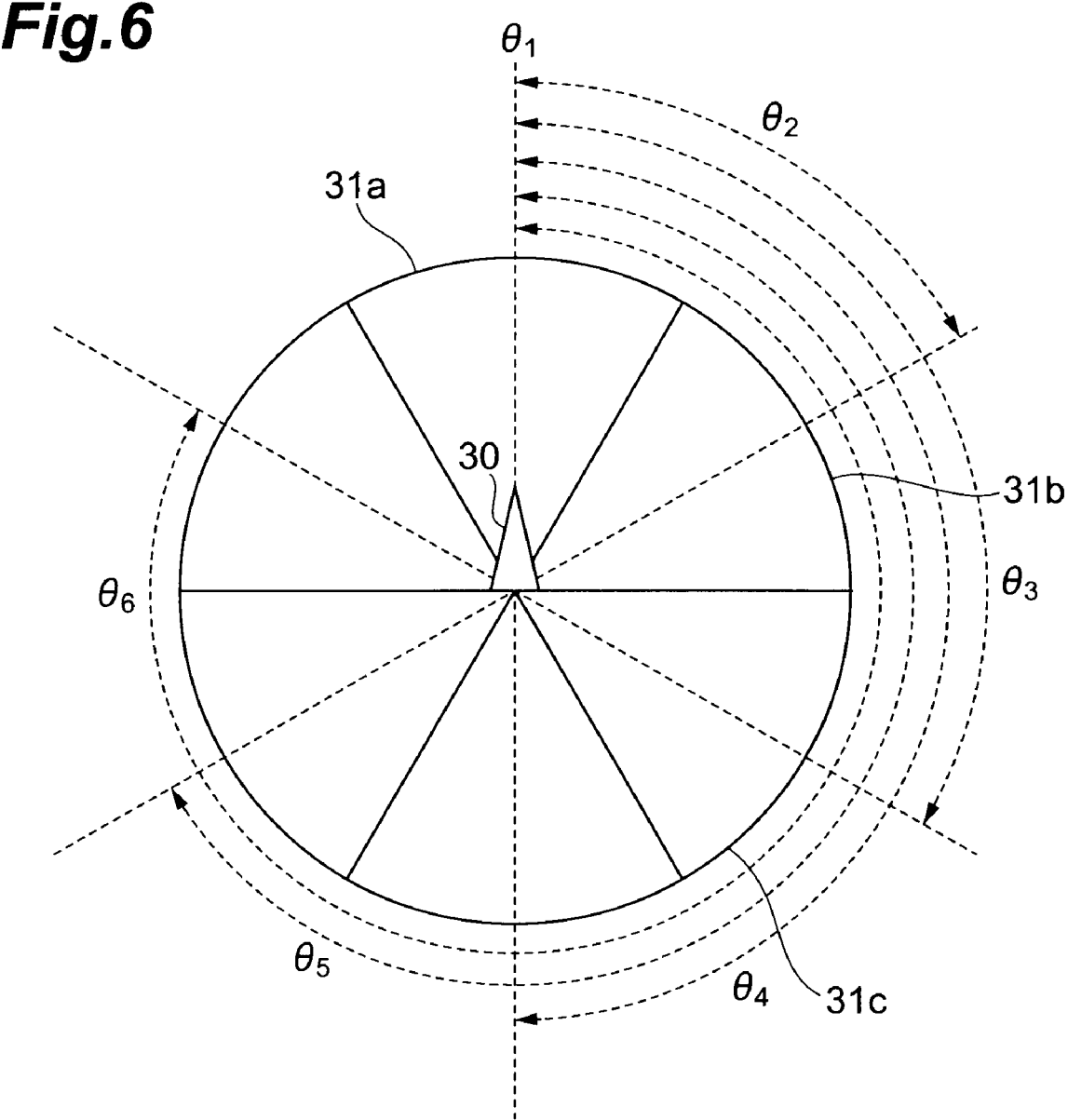
FIG. 6 is a drawing showing sectors of a cellular base station and directions corresponding to the sectors.

In the positioning server 10, the direction information acquisition unit 14 then specifies a direction of a radio wave being a positioning signal, based on the sector ID of the location sector, with each positioning signal (S04, a direction information acquisition step). For example, the direction of the radio wave is defined as a direction that bisects a central angle of the sector 31 identified by the sector ID. In which direction each sector 31 is directed is grasped with reference to the database storing the configuration of sectors. The direction of the radio wave (orientation direction of sector 31) can be represented, for example, by determining a reference direction (upward direction on the plane of FIG. 6) and defining a (clockwise) angle from the reference direction. In FIG. 6, for example, the direction of the radio wave of the sector 31a is defined as $\theta_1=0$, the direction of the radio wave of the sector 31b as $\theta_2=\pi/3$, and the direction of the radio wave of the sector 31c as $\theta_3=2\pi/3$. The information of the direction of the radio wave thus specified is fed to the virtual sector calculation unit 15.

At this point of time, the virtual sector calculation unit 15 has received the input of information (measurement results) of the base station ID, the radio wave direction, and the distance for each positioning signal, as the information for measurement of the location of the cellular terminal 20. The n measurement results herein are denoted as follows:

$B_i$: base station ID, $\theta_i$: direction of the radio wave (sector orientation direction), $R_i$: distance between the cellular terminal 20 and the cellular base station 30.

The subscript i herein represents an index corresponding to one piece of information (one measurement: reception of one positioning signal) and is an integer of 1-n. For example, where six pieces of information are obtained, they are arranged as shown in FIG. 7 (*a*).

The virtual sector calculation unit 15 calculates the virtual sector, based on the foregoing information (S05, a direction range calculation step). The virtual sector calculation process will be described below.

First, clustering is performed for all the measurement results $\{B_i, \theta_i, R_i | 1 \leq i \leq n\}$. Specifically, it is performed as follows.

1. The measurement results with the same $B_i$ of the base station ID are grouped into $B'_j$. The number of groups (the number of base station IDs) is defined as b. In the above notation the subscript j represents an index of each base station ID.

2. Furthermore, for the measurement results with the base station ID being $B'_j$, the measurement results with the same $\theta_i$ are grouped into $\theta_{j,k}$. The number of members (the number of directions of radio waves for each base station ID) is denoted by $p_j$. The subscript k herein represents an index of each radio wave direction.

3. Furthermore, the measurement results with the base station ID being $B'_j$ and with the same $\theta_i$ are grouped into $R_{j,k,l}$ and the number of members (the number of distances for each base station ID and each direction of radio wave) is denoted by $m_{j,k}$. The subscript l herein represents an index of each distance.

FIG. 7 (*b*) shows the result of the above-described clustering for the measurement results of FIG. 7 (*a*). In this example, the parameters are defined as follows:

b=3, $p_1=2, p_2=1, p_3=1$, $m_{1,1}=2, m_{1,2}=1, m_{2,1}=2$, and $m_{3,1}=1$.

Figure 8:
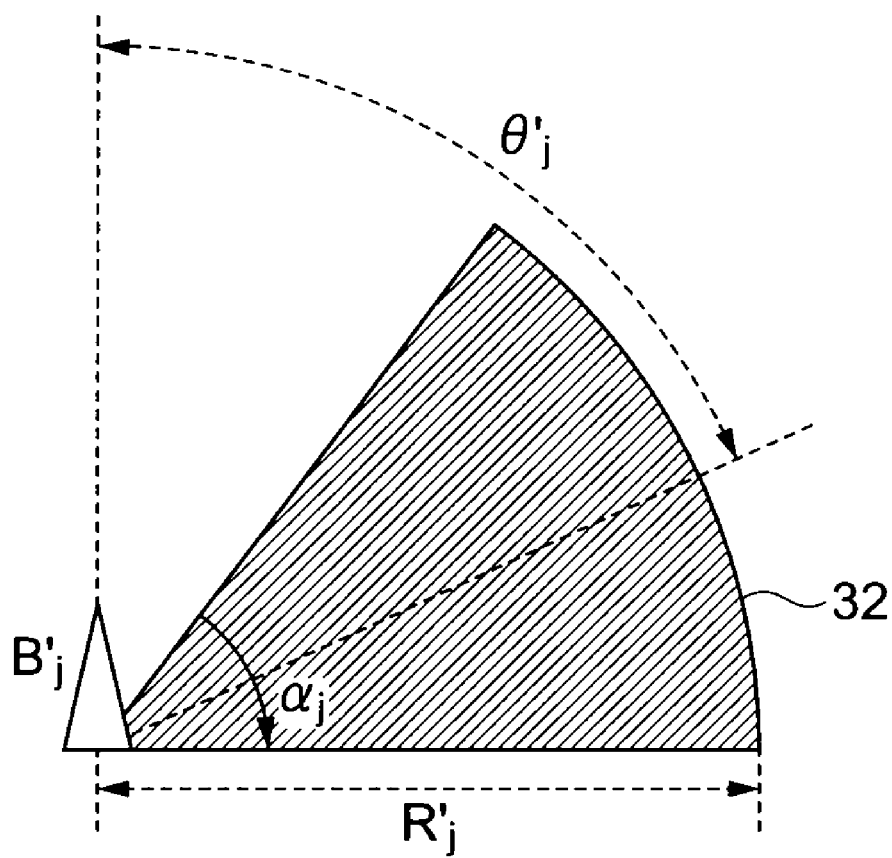
FIG. 8 is a drawing showing a virtual sector.

Then the measurement results after the clustering are used to calculate each of the angle spread $\alpha_j$ of the virtual sector 32, the orientation direction $\theta'_j$ of the virtual sector, and the radius $R'_j$ of the virtual sector which are parameters of the virtual sector 32 as shown in FIG. 8, for each $B'_j$ (cellular base station 30).

Calculation methods of virtual sector $B'_j$ will be described below.

[Calculation of Angle Spread $\alpha_j$ of Virtual Sector]

The calculation described below is carried out based on the range calculation rule stored in the virtual sector calculating means 15. In $B'_j$, the angle spread $\alpha_j$ of the virtual sector is calculated as a function F of the orientation direction $\theta_{j,k}$ of each sector 31.

In the case of the number $p_j$ of $\theta_{j,k}>1$:

An example of the function F to calculate the angle spread of the virtual sector is a function to calculate an angle of a minimum fan shape including all the orientation directions. A specific method is to sort all the orientation directions $\theta_{j,k}$ in ascending order and to define the result thereof as $\theta'_{j,k}$. With $\theta'_{j,k}$, a difference between two adjacent orientation directions, $\Delta\alpha_k=\theta'_{j,k+1}-\theta'_{j,k}$, is calculated. At this time, the first angle and the last angle are regarded as adjacent angles. If the angle difference is $\Delta\alpha_k<0$, $\Delta\alpha_k=2\pi+\Delta\Delta_k$ is applied. With the maximum angle MAX$[\Delta\alpha_k]$, the angle spread of the virtual sector 32 is defined as $2\pi-\text{MAX}[\Delta\alpha_k]$. Namely, the angle spread is determined as follows.

$$\theta'_{j,k} = \text{SORT}[\theta_{j,k}] \qquad \text{[Math 1]}$$

$$\Delta\alpha_k = \begin{cases} \theta'_{j,k+1} - \theta'_{j,k}, & 1 \le k < p_j \\ \theta'_{j,1} - \theta'_{j,k}, & k = p_j \end{cases}$$

and, $$\Delta\alpha_k = \begin{cases} \Delta\alpha_k, & 0 \le \Delta\alpha_k \\ 2\pi + \Delta\alpha_k, & \Delta\alpha_k < 0 \end{cases}$$

$$\alpha_j = F(\theta_{j,k}) = 2\pi - \text{MAX}_{k=1}^{p_j}[\Delta\alpha_k]$$

The angle spread of the virtual sector 32 determined as described above is calculated so as to include the sector orientation direction $\theta_j$ associated with the virtual sector 32.

Another applicable function is one to narrow the angle spread of the virtual sector 32 according to the number $m_{j,k}$ of $R_{j,k,l}$ in $\theta_{j,k}$ so as to improve the reliability of the virtual sector in accordance with the number of received signals. Namely, a decreasing function with $m_{j,k}$ is used. Conceivable functions include the following as examples based on the above-described function.

$$\theta'_{j,k} = \text{SORT}[\theta_{j,k}] \qquad \text{[Math 2]}$$

$$\Delta\alpha_k = \begin{cases} \theta'_{j,k+1} - \theta'_{j,k}, & 1 \le k < p_j \\ \theta'_{j,1} - \theta'_{j,k}, & k = p_j \end{cases}$$

and, $$\Delta\alpha_k = \begin{cases} \Delta\alpha_k, & 0 \le \Delta\alpha_k \\ 2\pi + \Delta\alpha_k, & \Delta\alpha_k < 0 \end{cases}$$

$$\alpha_j = F(\theta_{j,k})$$
$$= 2\pi - \text{MAX}_{k=1}^{p_j}[\Delta\alpha_k] - \gamma \cdot \sum_{k=1}^{p_j} m_{j,k} \, (\gamma:\text{constant}, 0 \le \gamma \le 2\pi)$$

or, $$\theta'_{j,k} = \text{SORT}[\theta_{j,k}] \qquad \text{[Math 3]}$$

$$\Delta\alpha_k = \begin{cases} \theta'_{j,k+1} - \theta'_{j,k}, & 1 \le k < p_j \\ \theta'_{j,0} - \theta'_{j,k}, & k = p_j \end{cases}$$

and, $$\Delta\alpha_k = \begin{cases} \Delta\alpha_k, & 0 \le \Delta\alpha_k \\ 2\pi + \Delta\alpha_k, & \Delta\alpha_k < 0 \end{cases}$$

$$\alpha_j = F(\theta_{j,k})$$
$$= \left(2\pi - \text{MAX}_{k=1}^{p_j}[\Delta\alpha_k]\right) \cdot \frac{100 - \sum_{k=1}^{p_j} m_{j,k}}{100} \cdot \gamma$$

$(\gamma:\text{constant}, 0 \le \gamma \le 1)$

In the case of the number $p_j$ of $\theta_{j,k}=1$:

An example of the function to calculate the angle spread of the virtual sector is to define $\alpha_j$ as a constant in $[0, 2\pi]$. Namely, $\alpha_j$ is determined as follows.

$$\alpha_j = \phi \, (\phi: \text{constant}, 0 \le \phi \le 2\pi) \qquad \text{[Math 4]}$$

As an example, in the case of the cellular system as in the present embodiment, it is effective to use a value larger than the angle spread of one sector, e.g., $\pi$, as the value of $\phi$.

Another applicable function is one to narrow the angle spread of the virtual sector in accordance with the number $m_{j,k}$ of $R_{j,k,l}$ in $\theta_{j,k}$ of interest. Examples of conceivable functions include the following.

$$\alpha_j = -m_{j,1}\gamma \, (\phi,\gamma: \text{constant}, 0 \le \phi \le 2\pi, 0 \le \gamma \le 2\pi) \qquad \text{[Math 5]}$$

or, $$\alpha_j = \phi \cdot \frac{\gamma}{m_{j,1}} \, (\phi, \gamma:\text{constant}, 0 \le \phi \le 2\pi, 0 \le \gamma \le 2\pi) \qquad \text{[Math 6]}$$

Since the virtual sector 32 is a sector indicating a range in which the cellular terminal 20 can exist as described above, it is preferably calculated so as to narrow the angle spread, also based on the number $(m_{j,k})$ of positioning signals for each cellular base station 30 received by the cellular terminal 20. The coefficient $\gamma$ in the forgoing equations is preferably determined on as as-needed basis from the foregoing point of view.

[Calculation of Orientation Direction $\theta'_j$ of Virtual Sector]

In $B'_j$, the orientation direction $\theta'_j$ of the virtual sector 32 is calculated as a function G of the orientation direction $\theta_{j,k}$ of each sector 31, or as a function G of the distance $R_{j,k,l}$ between the cellular base station 30 and the cellular terminal 20, and $\theta_{j,k}$.

In the case of the number $p_j$ of $\theta_{j,k}>1$:

An example of the function to calculate $\theta'_j$ is to use an orientation direction of a bisector to bisect the central angle of the virtual sector 32. Specifically, it is determined by obtaining two orientation directions $\theta_1$, $\theta_2$ ($\theta_1>\theta_2$) making the angle spread of the virtual sector 32 and defining $\theta'_j$ as a direction $(\theta_1-\theta_2)/2$ of a middle angle. However, if the angle difference between $\theta_1$ and $\theta_2$ is larger than $\pi$, $\theta'_j-\pi$ is determined to be the orientation direction. Namely, the orientation direction is calculated as follows.

$$\theta'_j = G(\theta_{j,k}) = \begin{cases} \dfrac{\theta_1 - \theta_2}{2}, & 0 \le |\theta_1 - \theta_2| \le \pi \\ \dfrac{\theta_1 - \theta_2}{2} - \pi, & \pi < |\theta_1 - \theta_2| < 2\pi \end{cases} \quad \text{[Math 7]}$$

Another example of the function to calculate $\theta'_j$ is to use an average of all $\theta_{j,k}$. Namely, the orientation direction is calculated as follows.

$$\theta'_j = G(\theta_{j,k}) = \frac{\sum_{k=1}^{p_j}[\theta_{j,k}]}{p_j} \quad \text{[Math 8]}$$

Still another example of the function to calculate $\theta'_j$ is to determine the orientation direction with the smallest $R_{j,k,l}$ as $\theta'_j$. Namely, the orientation direction is calculated as follows.

$$\theta'_j = G(\theta_{j,k}, R_{j,k,l}) \quad \text{[Math 9]}$$
$$= \theta_{j',k'}\left(j', k': R_{j',k',l'} = \underset{k=1}{\overset{p_j}{\text{MIN}}}\left[\underset{l=1}{\overset{m_{j,k}}{\text{MIN}}}[R_{j,k,l}]\right]\right)$$

Still another example of the function to calculate $\theta'_j$ is to use an average of all $\theta_{j,k}$ taking account of the number of $R_{j,k,l}$. Namely, an applicable function is as follows.

$$\theta'_j = G(\theta_{j,k}, R_{j,k,l}) = \frac{\sum_{k=1}^{p_j}[\theta_{j,k} \cdot m_{j,k}]}{\sum_{k=1}^{p_j}[m_{j,k}]} \quad \text{[Math 10]}$$

In the case of the number $p_j$ of $\theta_{j,k}=1$:

An example of the function to calculate $\theta'_j$ is to use $\theta_{j,k}$ as $\theta'_j$. Namely, it can be defined as follows.

$$\theta'_j = \theta_{j,k} \quad \text{[Math 11]}$$

[Calculation of Radius $R'_j$ of Virtual Sector]

In $B'_j$, the radius $R'_j$ of the virtual sector 32 is calculated as a function H of the distance $R_{j,k,l}$ between the cellular base station 30 and the cellular terminal 20 in $B'_j$.

In the case of the total number $\Sigma m_{j,k}$ of $R_{j,k,l} > 1$:

An example of the function to calculate $R'_j$ is to use any value of $R_{j,k,l}$ as $R'$. Namely, it is defined as follows.

$$R'_j = H(R_{j,k,l}) = \forall R \in R_{j,k,l} \quad \text{[Math 12]}$$

Another example of the function to calculate $R'_j$ is to use a minimum of $R_{j,k,l}$ as $R'_j$. Namely, it is defined as follows.

$$R'_j = H(R_{j,k,l}) = \underset{k=1}{\overset{p_j}{\text{MIN}}}\left[\underset{l=1}{\overset{m_{j,k}}{\text{MIN}}}[R_{j,k,l}]\right] \quad \text{[Math 13]}$$

Still another example of the function to calculate $R'_j$ is to use an average of $R_{j,k,l}$ as $R'_j$. Namely, it is defined as follows.

$$R'_j = H(R_{j,k,l}) = \frac{\sum_{k=1}^{p_j}\sum_{l=1}^{m_{j,k}} R_{j,k,l}}{\sum_{k=1}^{p_j} m_{j,k}} \quad \text{[Math 14]}$$

Another example of the function to calculate $R'_j$ is to perform clustering for $R_{j,k,l}$ and determine $R'_j$ according to the number of members in each cluster.

In the case of the total number $\Sigma m_{j,k}$ of $R_{j,k,l}=1$:

$R_{j,k,l}$ is used as $R'_j$. Namely, it can be defined as follows.

$$R'_j = R_{j,k,l} \quad \text{[Math 15]}$$

Figure 9:
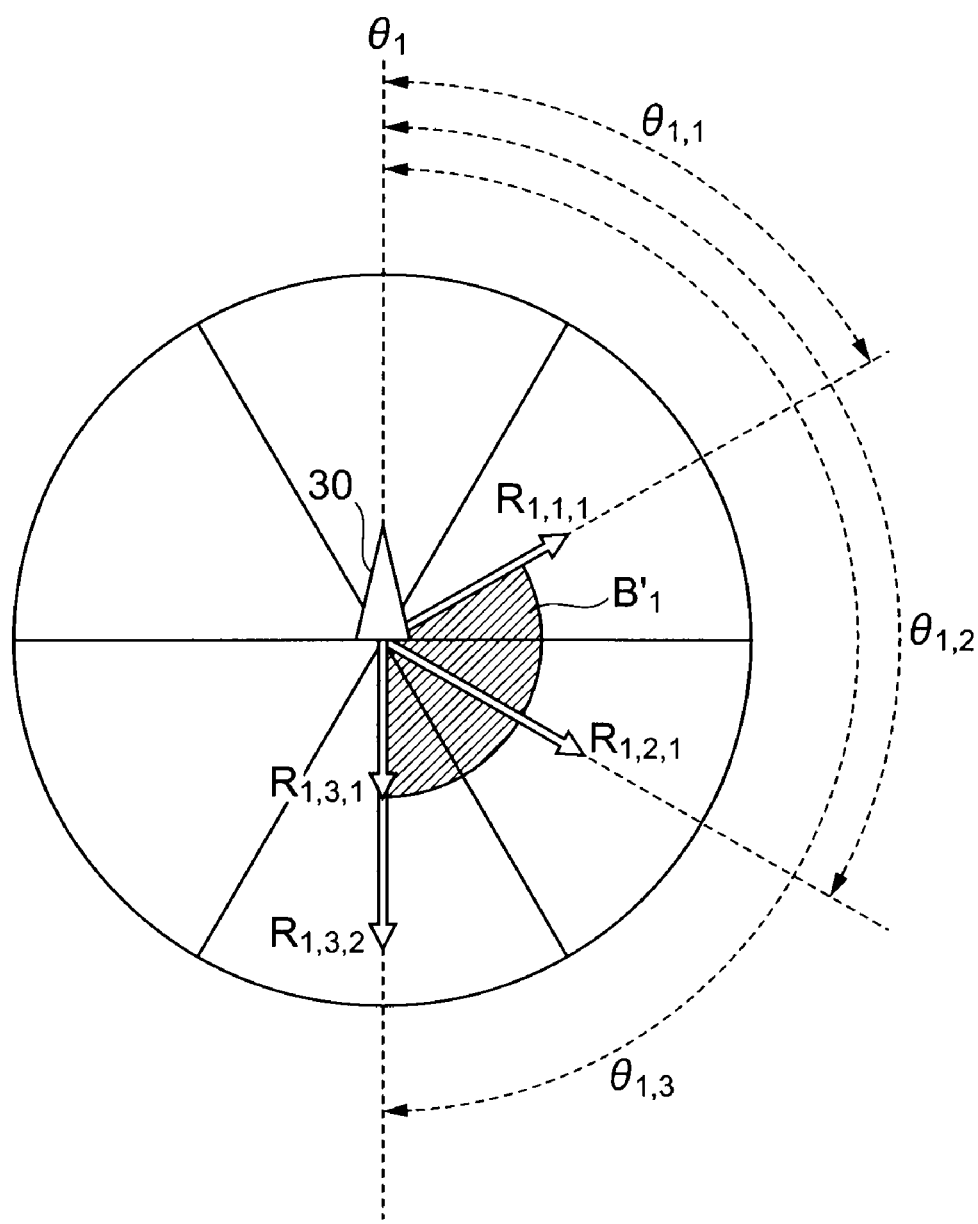
FIG. 9 is a drawing showing a specific example of the virtual sector.

FIG. 9 shows an example of the virtual sector 32 determined by the above-described method. In this example, the sector radius $R'_1 = R_{1,3,1}$, the angle spread $\alpha_1 = |\theta_{1,3} - \theta_{1,1}|$, and the orientation direction $\theta'_1 = (\theta_{1,3} - \theta_{1,1})/2$.

The information indicating the virtual sector 32 calculated by the virtual sector calculation unit 15 as described above, is outputted to the location calculation unit 16.

In the positioning server 10, the reliability evaluation unit 16a of the location calculation unit 16 then evaluates the reliability of the virtual sector 32 (S06, a reliability evaluation step and location calculation step). As the size of the virtual sector 32 becomes smaller, the location of the cellular terminal 20 is considered to be defined in a narrower range. The reliability is calculated based on the above-described idea. The reliability $\epsilon_j$ is calculated by a function E of the sector radius $R'_j$ and the angle spread $\alpha_j$ of the virtual sector $B'_j$. It is assumed that the reliability of the virtual sector B'j becomes higher with decrease in the value of reliability $\epsilon_j$.

An example of the evaluation function E of the virtual sector is to apply the following.

In the case of the angle spread of the virtual sector in $0 \le \alpha_j \le \pi$:

In the region of $[0, \pi]$, an increasing function of the sector radius $R'_j$ and the angle spread $\alpha_j$ of the virtual sector is used as a reliability function. Any one of the following functions can be used as the reliability function.

(1) Use the area of the virtual sector. Namely, it is defined as follows.

$$\varepsilon_j = E(R'_j, \alpha_j) = \frac{\alpha_j R'^2_j}{2} \quad \text{[Math 16]}$$

(2) Use a distance from an end point on an arc of the virtual sector to a middle point of the arc. Namely, it is defined as follows.

$$\varepsilon_j = E(R'_j, \alpha_j) = \sqrt{2R'^2_j\left(1 - \cos\frac{\alpha_j}{2}\right)} \quad \text{[Math 17]}$$

(3) Use a distance from an end point on the arc of the virtual sector to the centroid of the virtual sector. Namely, it is defined as follows.

$$\varepsilon_j = E(R'_j, \alpha_j) = R'^2_j \left( 1 + \frac{4\sin^2(\alpha_j/2)}{9(\alpha_j/2)^2} - \frac{4\sin\alpha_j}{3\alpha_j} \right) \quad \text{[Math 18]}$$

Figure 10:
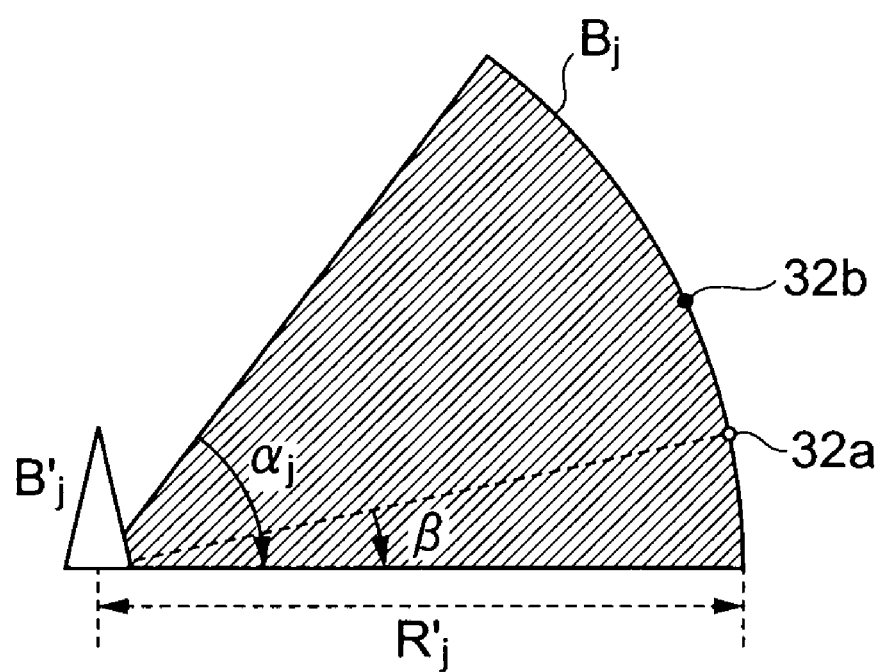
FIG. 10 is a drawing showing a virtual sector in determination of reliability.

(4) Use an average estimation error in a case where the middle point of the arc of the virtual sector is defined as an estimated location of a point on the arc of the virtual sector. Namely, where the distance from an arbitrary point 32a to the middle point 32b of the arc is r, as shown in FIG. 10, it is defined as follows.

$$r = \sqrt{2R'^2_j(1 - \cos(\alpha_j/2 - \beta))} \quad \text{[Math 19]}$$

$$\varepsilon_j = E(R'_j, \alpha_j) = \int_0^{\alpha_j/2} r\, d\beta$$

(5) Use the sum of distances from the two end points on the arc of the virtual sector to the middle point of the arc. Namely, it is defined as follows.

$$\varepsilon_j = E(R'_j, \alpha_j) = 2\sqrt{2R'^2_j\left(1 - \cos\frac{\alpha_j}{2}\right)} \quad \text{[Math 20]}$$

(6) Use a length of a chord of the virtual sector (a distance from one end point to the other end point on the arc). Namely, it is defined as follows.

$$\varepsilon_j = E(R'_j, \alpha_j) = \sqrt{2R'^2_j(1 - \cos\alpha_j)} \quad \text{[Math 21]}$$

Figure 11:
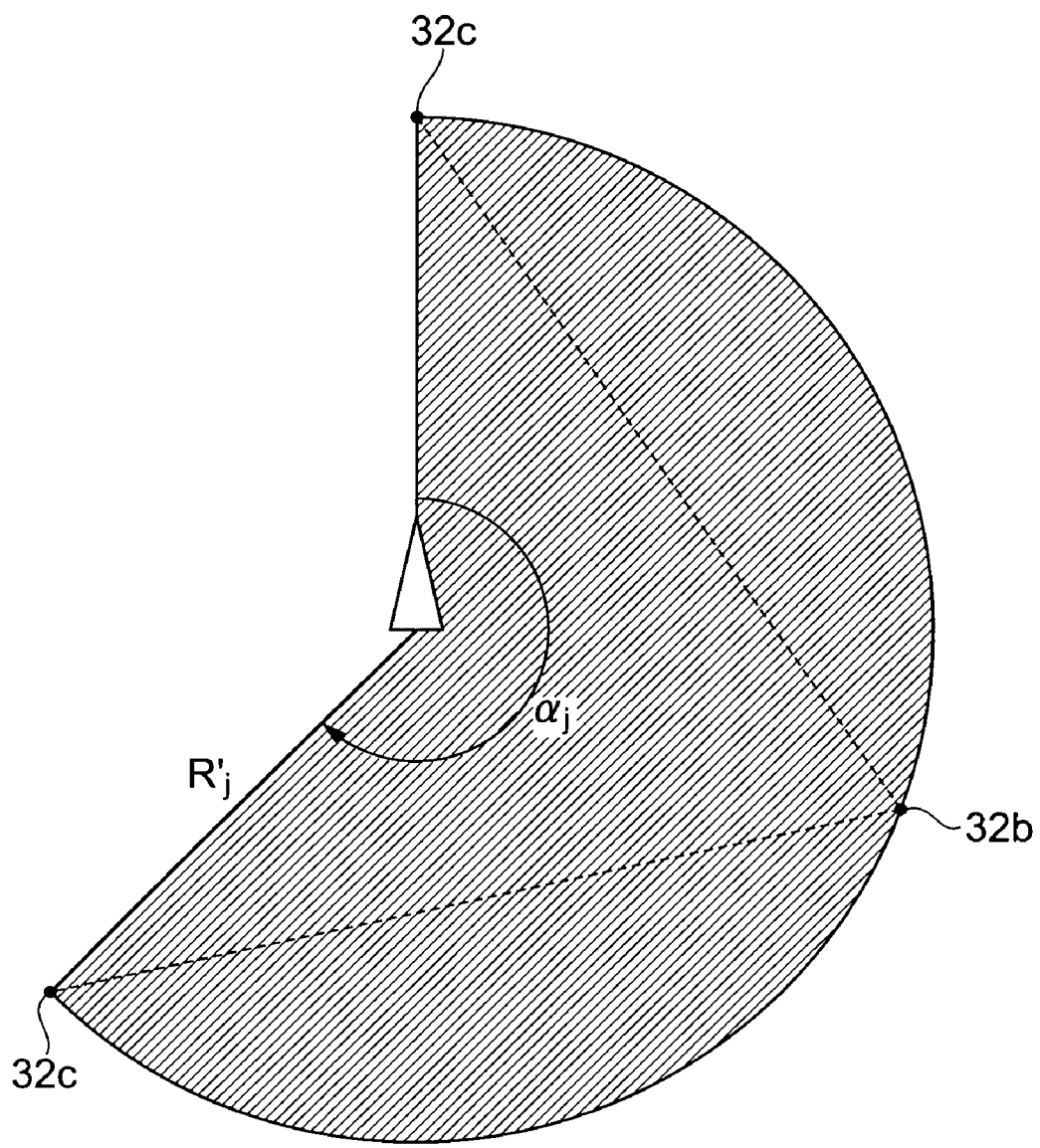
FIG. 11 is a drawing showing a virtual sector in determination of reliability.

In the case of the angle spread of the virtual sector in $\pi < \alpha_j < 2\pi$:

In the region of ($\pi$, $2\pi$), an increasing function of the sector radius $R'_1$ and the angle spread $\alpha_j$ of the virtual sector is used as the reliability function. The function can be, for example, any one of (1), (2), (4), and (5) in the foregoing case of $0 \leq \alpha_j \leq \pi$, e.g., the sum of distances from the two end points 32c of the arc of the virtual sector to the middle point 32b of the arc, as shown in FIG. 11. In the region of [0, $2\pi$), a combination of two types of the foregoing functions in the regions [0, $\pi$] and ($\pi$, $2\pi$) can be used.

After the reliability evaluation unit 16a evaluates the reliability $\varepsilon_j$ of the virtual sector 32 associated with each cellular base station 30 as described above, the determination unit 16b then determines the virtual sector 32 used in the calculation of the location of the cellular terminal 20, based on the reliabilities (S07, a determination step and location calculation step). For example, where the location calculation rule is set to calculate the location of the cellular terminal 20 from one virtual sector 32, the virtual sector used in the calculation of the location is determined to be a virtual sector 32 having a value indicating the highest reliability $\varepsilon_j$ (the smallest numeral in the present embodiment). When the location calculation rule is determined to calculate the location from two virtual sectors 32, two virtual sectors 32 are determined in the same manner as above. Whether the calculation of the location is performed using one virtual sector or two virtual sectors may be determined based on values of reliability $\varepsilon_j$ of respective virtual sectors 32 (e.g., if there are two or more virtual sectors with high reliability, two virtual sectors are used, or the like).

Figure 12:
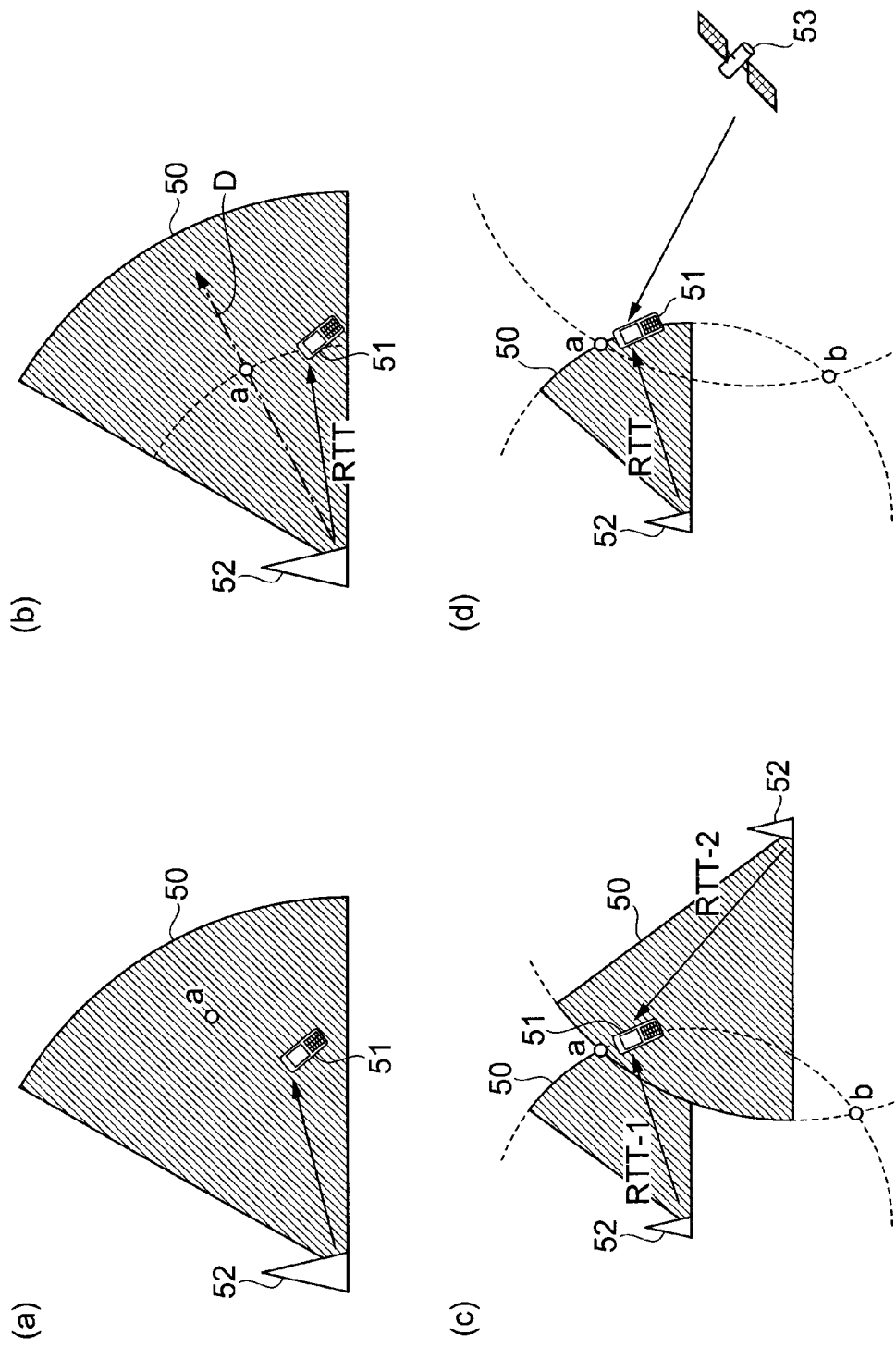
FIG. 12 is a drawing schematically showing the conventional positioning methods.

In the positioning server 10, the location calculation unit 16 then calculates the location of the cellular terminal 20 from the determined virtual sector 32 (S08, a location calculation step). The calculation of the location can be performed by applying a method similar to the aforementioned RTT positioning, using the information of the virtual sector 32. Namely, it is calculated on the assumption that the cellular terminal 20 is located at the position of the distance $R_j$ between the cellular terminal 20 and the cellular base station 30 in the virtual sector 32 with the direction $\theta_j$ of virtual sector, from the cellular base station 30 associated with the virtual sector 32 thus determined. The calculation of the location is performed using the information of the positions of the cellular base stations 30 stored in the database of the positioning server 10. The calculation of the location is also performed in the same manner in the case where two virtual sectors are used (the directions shown in FIG. 12 (c)).

The information of the location of the cellular terminal 20 thus calculated is outputted according to need, e.g., it is transmitted to the cellular terminal 20 having sent the positioning request. The above described the processing executed in the positioning server 10, the cellular terminal 20, and the cellular base stations 30 according to the present embodiment.

In the present embodiment, as described above, the virtual sector with the angle spread (range of directions) is calculated based on transmission and reception of a plurality of radio waves (positioning signals) and the location of the cellular terminal 20 is calculated based on the virtual sector.

The propagation environments of radio waves normally vary depending upon movement of the cellular terminal 20 and change in the ambient environment. In such environments, direct waves and reflected waves are stochastically received, so as to increase the possibility of reception of radio waves in a better propagation environment, i.e., signals close to the direct waves. Since in the present embodiment the location is calculated based on the virtual sector taking account of the distances and directions based on "the plurality of radio waves" as described above, it becomes feasible to perform the positioning based on signals close to the direct waves. This permits the present embodiment to accurately position the cellular terminal 20 even in an environment in which delay waves are included in radio waves arriving at the cellular terminal 20 from the cellular base stations 30.

The angle spread of the virtual sector is preferably calculated, also based on the number of positioning signals from each cellular base station 30 received by the cellular terminal 20, as in the present embodiment. This configuration enables more accurate positioning, for example, by placing a higher reliability on the virtual sector of the cellular base station 30 from which more positioning signals are received, and emphasizing radio waves from the cellular base station 30.

When the location is calculated by calculating the reliabilities of respective virtual sectors and determining the virtual sector used in the calculation of the location on the basis of the reliabilities as in the present embodiment, the positioning can be performed based on the radio waves from the cellular base station 30 suitable for the positioning, and therefore further accurate positioning can be performed.

When the positioning signal is transmitted as in the present embodiment, the radio waves can be certainly emitted from the cellular base stations 30 and the radio waves used in the positioning can be definitely determined, whereby the present invention can be surely carried out. It is, however, noted that the positioning signal does not always have to be transmitted, for example, where existing radio waves are available.

When the calculation of distance from each radio wave is performed using the propagation delay or intensity attenuation of the radio wave as in the present embodiment, the present invention can be surely carried out. When the direction of each radio wave is calculated based on the sectors of the cellular base stations 30, the present invention can be surely carried out. It is, however, noted that the above-described configuration does not always have to be employed, for example, where the cellular terminal 20 is equipped with a mechanism capable of detecting a directivity of a radio wave. The foregoing configuration does not always have to be employed, either, for example, where each cellular base station 30 is equipped with a mechanism capable of detecting a directivity of a radio wave from the cellular terminal 20.

Figure 15:
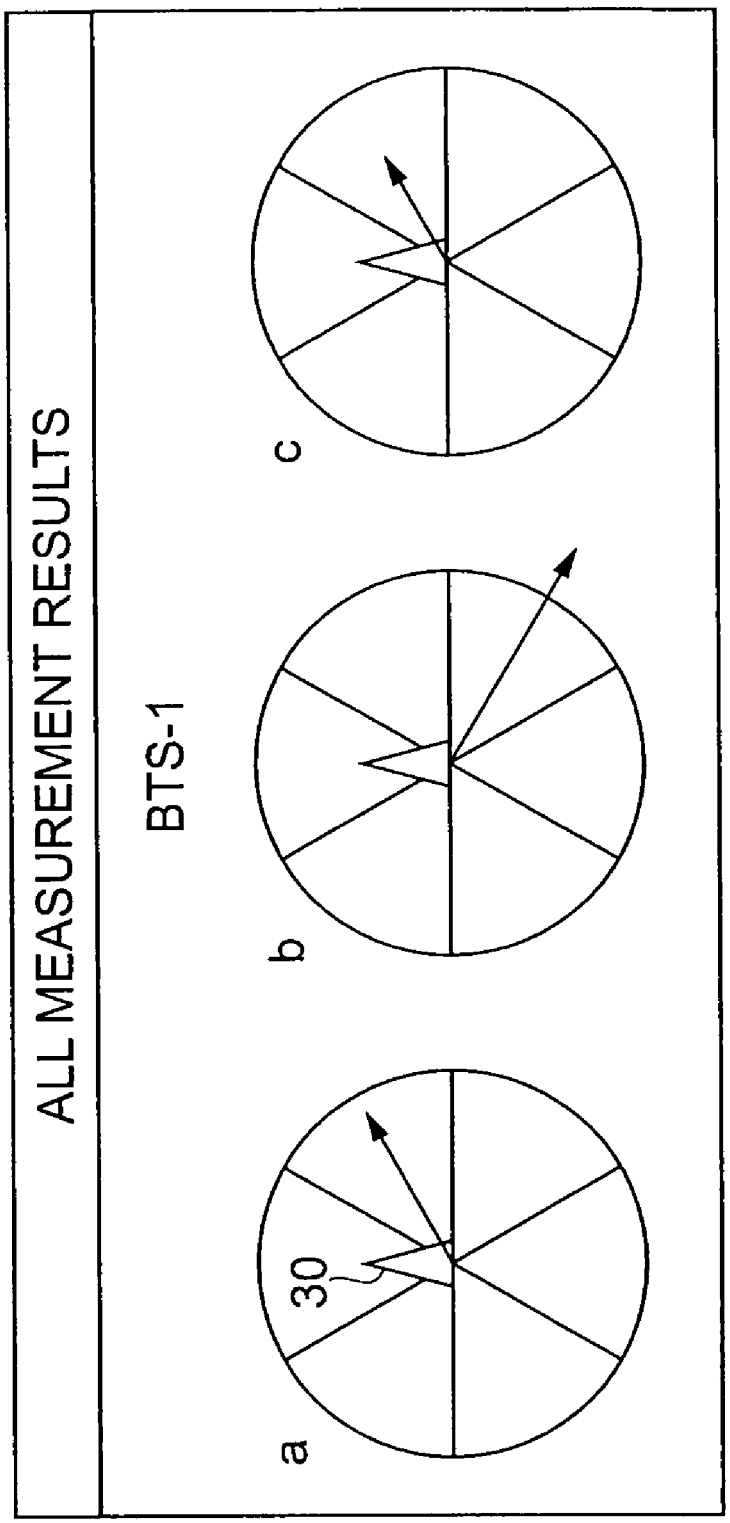
FIG. 15 is a drawing showing some examples of the measurement results with positioning signals from one cellular base station.
Figure 16:
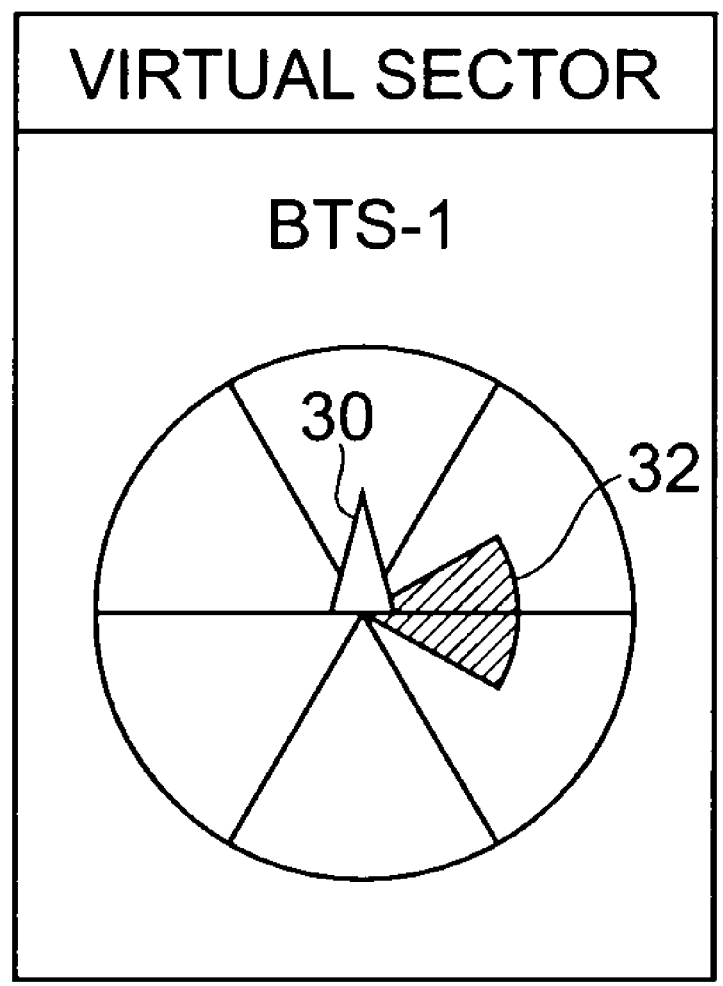
FIG. 16 is a drawing showing a virtual sector of one cellular base station.

The present embodiment described the example where there were a plurality of radio wave sources as shown in FIG. 2, but the present invention can also be applied to cases where information about a plurality of radio waves is acquired from one radio wave source. For example, as shown in FIG. 15, where the reception results by the cellular terminal 20 are the information about radio waves from only one cellular base station 30, it is also possible to calculate the virtual sector shown in FIG. 16 and calculate the location of the cellular terminal 20 on the basis of the information indicating the virtual sector, as in the present embodiment. In this case, it is also possible to evaluate the reliability $\epsilon_j$ of the virtual sector by the reliability evaluation unit 16a and to perform the calculation of the location of the cellular terminal 20 only if the determination unit 16b determines that the reliability $\epsilon_j$ is larger than a predetermined threshold.

The present embodiment described the example of the cellular system, but the present invention can also be applied to any other positioning system as long as it is a positioning system of calculating the distance and direction from the radio wave source to the mobile communication terminal and estimating the location of the mobile communication terminal. In the present embodiment the functions of the positioning system were implemented as the positioning server 10, but the mobile communication terminal itself as an object to be positioned may have the functions.

Figure 14:
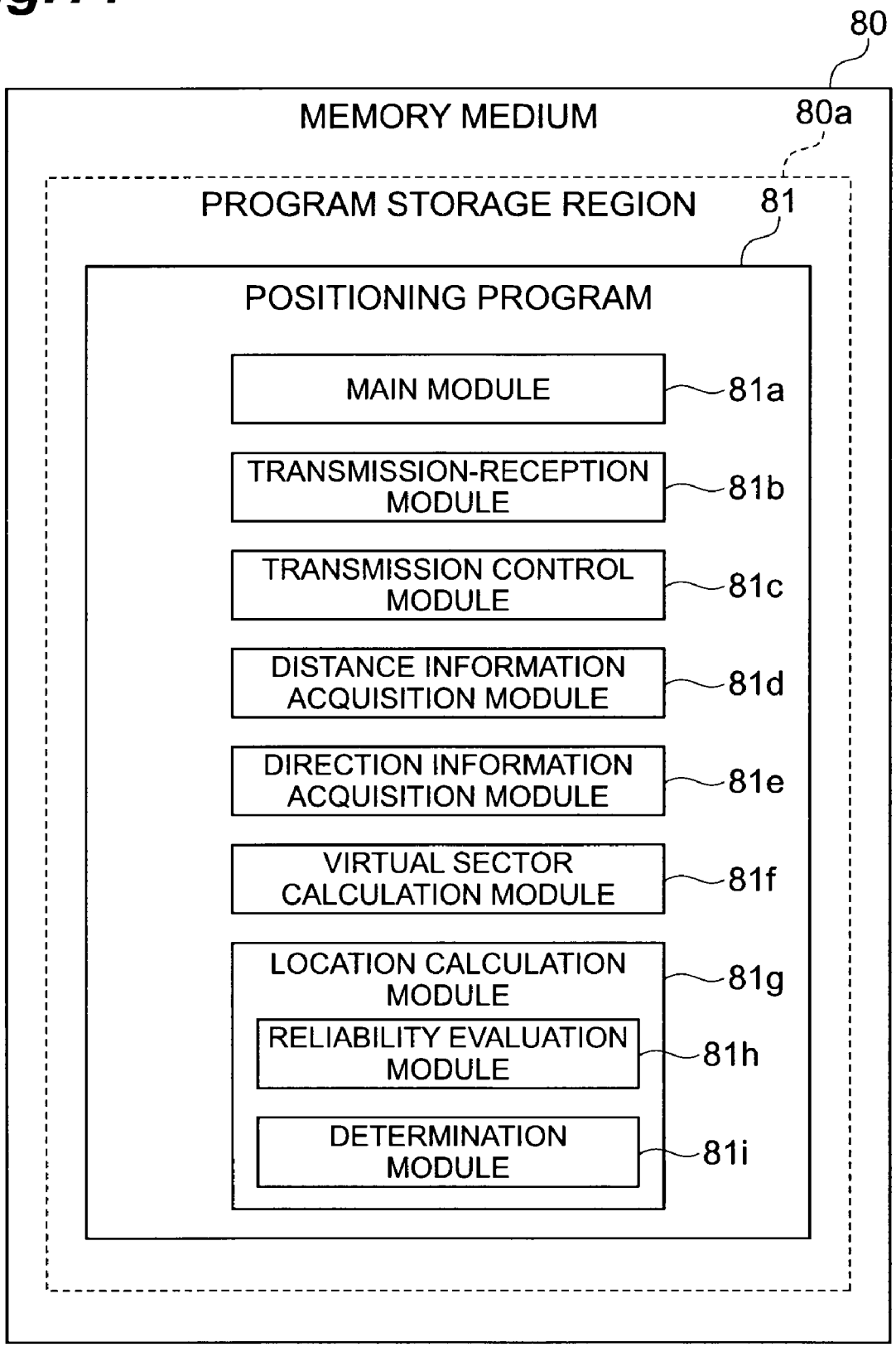
FIG. 14 is a drawing showing a configuration of a positioning program according to the present invention.

The following will describe a positioning program for letting a computer execute the aforementioned sequential processing of positioning of the mobile communication terminal. As shown in FIG. 14, the positioning program 81 is stored in a program storage region 80a formed in a recording medium 80 which the computer has.

The positioning program 81 is comprised of a main module 81a for systematically controlling the positioning processing, a transmission-reception module 81b, a transmission control module 81c, a distance information acquisition module 81d, a direction information acquisition module 81e, a virtual sector calculation module 81f, and a location calculation module 81g including a reliability evaluation module 81h and a determination module 81i. The functions implemented by execution of the transmission-reception module 81b, the transmission control module 81c, the distance information acquisition module 81d, the direction information acquisition module 81e, the virtual sector calculation module 81f, the location calculation module 81g, the reliability evaluation module 81h, and the determination module 81i are the same as the respective functions of the transmitter-receiver unit 11, the transmission control unit 12, the distance information acquisition unit 13, the direction information acquisition unit 14, the virtual sector calculation unit 15, the location calculation unit 16, the reliability evaluation unit 16a, and the determination unit 16b of the positioning server 10 described above.

The positioning program 81 may also be configured in such a configuration that a part or the whole thereof is transmitted through a transmission medium such as a communication circuit and received and recorded (including being installed) by another device.

What is claimed is:

1. A positioning system for estimating a location of a mobile communication terminal, comprising:
a processor;
a distance information acquiring unit configured to acquire information indicating distances between at least one radio wave source and the mobile communication terminal, the distances being calculated based on radio waves transmitted and received between said at least one radio wave source and the mobile communication terminal;
a direction information acquiring unit configured to acquire a plurality of pieces of information indicating directions of radio waves transmitted from the at least one radio wave source and received by the mobile communication terminal;
a direction range calculating unit configured to calculate a range of directions from the at least one radio wave source to the mobile communication terminal from the pieces of information indicating the directions of the acquired radio waves based on a range calculation rule stored in advance;
a location calculating unit configured to calculate the location of the mobile communication terminal based on the distances acquired by the distance information acquiring unit and the range of directions calculated by the direction range calculating unit for the at least one radio wave source;
a reliability evaluating unit configured to evaluate reliabilities of the radio waves for positioning of the mobile communication terminal, for the at least one radio wave source, from the distances acquired by the distance information acquiring unit and the range of directions calculated by the direction range calculating unit, based on a reliability calculation rule stored in advance; and
a determining unit configured to determine a radio wave source associated with information to be used for calculation of the location of the mobile communication terminal, based on the reliabilities evaluated by the reliability evaluating unit.

2. The positioning system according to claim 1, wherein the direction range calculating means calculates the range of directions also based on a number of times the mobile communication terminal has received radio waves from each of said plurality of radio wave sources.

3. The positioning system according to claim 1, wherein the position calculating unit calculates the direction from the radio wave source to the mobile communication terminal and the distance between the radio wave source and the mobile communication terminal, based on the radio waves transmitted and received between the radio wave source determined by the determining unit, and the mobile communication terminal, and calculates the location of the mobile communication terminal from the direction and the distance.

4. The positioning system according to claim 3, wherein the location calculating unit calculates the direction from the radio wave source determined by the determining unit, to the mobile communication terminal, as a center of the range of directions from the source to the mobile communication terminal.

5. The positioning system according to claim 3, wherein the location calculating unit calculates the direction from the source determined by the determining unit, to the mobile communication terminal, as an average of directions of the radio waves transmitted from the source and received by the mobile communication terminal.

6. The positioning system according to claim 3, wherein the location calculating unit calculates the direction from the source determined by the determining unit, to the mobile communication terminal, as a direction to provide a minimum distance between the source and the mobile communication terminal calculated based on the radio waves, among directions of the radio waves transmitted from the source and received by the mobile communication terminal.

7. The positioning system according to claim 3, wherein the location calculating unit calculates the distance between the radio wave source determined by the determining unit, and the mobile communication terminal, as one of the distances calculated based on the radio waves transmitted and received between the source and the mobile communication terminal.

8. The positioning system according to claim 7, wherein the location calculating unit calculates the distance between the radio wave source determined by the determining unit, and the mobile communication terminal, as a minimum of the distances calculated based on the radio waves transmitted and received between the radio wave source and the mobile communication terminal.

9. The positioning system according to claim 3, wherein the location calculating unit calculates the distance between the source determined by the determining unit, and the mobile communication terminal, as an average of the distances calculated based on the radio waves transmitted and received between the source and the mobile communication terminal.

10. The positioning system according to claim 3, wherein the location calculating unit calculates the distance between the source determined by the determining unit, and the mobile communication terminal, by clustering the distances calculated based on the radio waves transmitted and received between the source and the mobile communication terminal, into ranges of distances.

11. The positioning system according to claim 1, further comprising transmission control unit for performing a control to let the at least one radio wave source transmit a positioning signal to the mobile communication terminal, as the radio waves for use for calculation of the distances acquired by the distance information acquiring unit and for acquisition of the directions by the direction information acquiring unit.

12. The positioning system according to claim 11, wherein the distance information acquiring unit calculates the distance, based on a propagation delay or an intensity attenuation of a response signal transmitted from the mobile communication terminal having received the positioning signal transmitted from the source under the control by the transmission control unit, in accordance with the reception of the positioning signal, and received by the source.

13. The positioning system according to claim 1, wherein the direction information acquiring unit acquires information of directions based on sectors of the radio waves received by the mobile communication terminal, as the information indicating the directions of the radio waves.

14. A positioning system for estimating a location of a mobile communication terminal, comprising:
   a processor;
   a distance information acquiring unit configured to acquire information indicating distances between a plurality of radio wave sources and the mobile communication terminal, the distances being calculated based on radio waves transmitted and received between said plurality of radio wave sources and the mobile communication terminal;
   a direction information acquiring unit configured to acquire a plurality of pieces of information indicating directions of radio waves transmitted from the plurality of radio wave sources and received by the mobile communication terminal;
   a direction range calculating unit configured to calculate a range of directions from the plurality of radio wave sources to the mobile communication terminal from the pieces of information indicating the directions of the radio waves based on a range calculation rule stored in advance; and
   a location calculating unit configured to calculate the location of the mobile communication terminal, based on the distances acquired by the distance information acquiring unit and the range of directions calculated by the direction range calculating unit for each of the plurality of radio wave sources;
   a reliability evaluating unit configured to evaluate reliabilities of the radio waves for positioning of the mobile communication terminal, for each of the plurality of radio wave sources, from the distances acquired by the distance information acquiring unit and the range of directions calculated by the direction range calculating unit, based on a reliability calculation rule stored in advance; and
   a determining unit configured to determine a radio wave source associated with information to be used for calculation of the location of the mobile communication terminal, based on the reliabilities evaluated by the reliability evaluating unit.

15. A positioning method for estimating a location of a mobile communication terminal, comprising:
   acquiring information indicating distances between at least one radio wave source and the mobile communication terminal calculated based on radio waves transmitted and received between said at least one radio wave source and the mobile communication terminal;
   acquiring a plurality of pieces of information indicating directions of radio waves transmitted from the at least one radio wave source and received by the mobile communication terminal;
   calculating a range of directions from the at least one radio wave source to the mobile communication terminal from the pieces of information indicating the directions of the radio waves based on a range calculation rule stored in advance;
   calculating a location of the mobile communication terminal, based on the distances acquired and the range of directions calculated;
   evaluating reliabilities of the radio waves for positioning of the mobile communication terminal, for the at least one radio wave source, from the distances acquired and the range of directions calculated, based on a reliability calculation rule stored in advance; and
   determining a radio wave source associated with information to be used for calculation of the location of the mobile communication terminal, based on the reliabilities evaluated.

16. A positioning method for estimating a location of a mobile communication terminal, comprising:
   acquiring information indicating distances between a plurality of radio wave sources and the mobile communication terminal, the distances being calculated based on radio waves transmitted and received between said plurality of radio wave sources and the mobile communication terminal;

acquiring a plurality of pieces of information indicating directions of radio waves transmitted from the plurality of radio wave sources and received by the mobile communication terminal;

calculating a range of directions from the plurality of radio wave sources to the mobile communication terminal from the pieces of information indicating the directions of the radio waves based on a range calculation rule stored in advance;

calculating a location of the mobile communication terminal, based on the distances acquired and the range of directions calculated;

evaluating reliabilities of the radio waves for positioning of the mobile communication terminal, for each of the plurality of radio wave sources, from the distances acquired and the range of directions calculated, based on a reliability calculation rule stored in advance; and determining a radio wave source associated with information to be used for calculation of the location of the mobile communication terminal, based on the reliabilities evaluated.

17. A non-transitory computer readable medium encoded with computer-readable instructions that when executed by a computer cause the computer to estimate a location of a mobile communication terminal, comprising:

acquiring information indicating distances between at least one radio wave source and the mobile communication terminal calculated based on radio waves transmitted and received between said radio wave source and the mobile communication terminal;

acquiring a plurality of pieces of information indicating directions of radio waves transmitted from the at least one radio wave source and received by the mobile communication terminal;

calculating a range of directions from the at least one radio wave source to the mobile communication terminal from the pieces of information indicating the directions of the radio waves based on a range calculation rule stored in advance;

calculating the location of the mobile communication terminal, based on the distances acquired and the range of directions calculated;

evaluating reliabilities of the radio waves for positioning of the mobile communication terminal, for the at least one radio wave source, from the distances acquired and the range of directions calculated, based on a reliability calculation rule stored in advance; and determining a radio wave source associated with information to be used for calculation of the location of the mobile communication terminal, based on the reliabilities evaluated.

18. A non-transitory computer readable medium encoded with computer-readable instructions that when executed by a computer cause the computer estimate a location of a mobile communication terminal, comprising:

acquiring information indicating distances between a plurality of radio wave sources and the mobile communication terminal calculated based on radio waves transmitted and received between said plurality of radio wave sources and the mobile communication terminal;

acquiring a plurality of pieces of information indicating directions of radio waves transmitted from the plurality of radio wave sources and received by the mobile communication terminal;

calculating a range of directions from the plurality of radio wave sources to the mobile communication terminal from the pieces of information indicating the directions of the radio waves based on a range calculation rule stored in advance;

calculating the location of the mobile communication terminal, based on the distances acquired and the range of directions calculated;

evaluating reliabilities of the radio waves for positioning of the mobile communication terminal, for each of the plurality of radio wave sources, from the distances acquired and the range of directions calculated, based on a reliability calculation rule stored in advance; and determining a radio wave source associated with information to be used for calculation of the location of the mobile communication terminal, based on the reliabilities evaluated.

* * * * *